US012432516B2

(12) United States Patent
Baumgarte et al.

(10) Patent No.: US 12,432,516 B2
(45) Date of Patent: Sep. 30, 2025

(54) METHOD AND SYSTEM FOR SPATIALLY RENDERING THREE-DIMENSIONAL (3D) SCENES

(71) Applicant: Apple Inc., Cupertino, CA (US)

(72) Inventors: Frank Baumgarte, Sunnyvale, CA (US); Dipanjan Sen, Dublin, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 18/471,780

(22) Filed: Sep. 21, 2023

(65) Prior Publication Data

US 2024/0114313 A1 Apr. 4, 2024

Related U.S. Application Data

(60) Provisional application No. 63/376,960, filed on Sep. 23, 2022, provisional application No. 63/376,958, filed on Sep. 23, 2022.

(51) Int. Cl.
H04S 7/00 (2006.01)
G06T 19/00 (2011.01)

(52) U.S. Cl.
CPC ............ H04S 7/303 (2013.01); G06T 19/006 (2013.01); H04S 7/304 (2013.01); H04S 2420/01 (2013.01)

(58) Field of Classification Search
CPC ...... H04S 7/303; H04S 7/304; H04S 2420/01; G06T 19/006
See application file for complete search history.

(56) References Cited

U.S. PATENT DOCUMENTS

2018/0124543 A1* 5/2018 Leppänen ............... H04S 7/303
2018/0190024 A1* 7/2018 Dugan .................. G06T 19/006
2021/0092546 A1* 3/2021 Terentiv .................. H04S 7/303

OTHER PUBLICATIONS

Guillaume Potard, "3D-Audio Object Oriented Coding", University of Wollongong Thesis Collection, received from https://ro.uow.edu.au/theses/539/, Sep. 2006, 25 Pages.
Rudzki et al., "Auditory Localization in Low-Bitrate Compressed Ambisonic Scenes", received from https://eprints.whiterose.ac.uk/147962/1/applsci_09_02618.pdf, Jun. 28, 2019, 16 pages.
Doenges et al., "MPEG-4: Audio/Video & Synthetic Graphics/Audio for Mixed Media", received from https://www.sciencedirect.com/science/article/abs/pii/S0923596597000076, May 19, 1998, 41 pages.

(Continued)

Primary Examiner — Andrew Sniezek
(74) Attorney, Agent, or Firm — Aikin & Gallant, LLP

(57) ABSTRACT

A method that includes receiving a first bitstream that includes an encoded version of an audio signal for a three-dimensional (3D) scene and a first set of metadata that has 1) a position of a 3D sub-scene within the scene and 2) a position of a sound source associated with the audio signal within the sub-scene; determining a position of a listener; spatially rendering the scene to produce the sound source with the audio signal at the position of the sound source with respect to the position of the listener; receiving a second bitstream that includes a second set of metadata that has a different position of the sub-scene; and adjusting the spatial rendering of the scene such that the position of the sound source changes to correspond to movement of the sub-scene from the position of the sub-scene to the different position of the sub-scene.

20 Claims, 16 Drawing Sheets

(56) References Cited

OTHER PUBLICATIONS

Potard et al., "Using XML Schemas to Create and Encode Interactive 3-D Audio Scenes for Multimedia and Virtual Reality Applications", received from https://link.springer.com/chapter/10.1007/3-540-36261-4_18, 11 pages, 2002.

* cited by examiner

```
ScenePositions() {
  for (i=0; i<numSceneOrigins; i++) {        6 uimsbf
    SceneOrigin(i+1, forConfig=1);
  }
}

SceneOrigin(Id, forConfig) {
  sceneOriginId = Id;
  Position(forConfig);
}
```

Table 1: Syntax of ScenePositions() payload

FIG. 8

```
ObjectMetadata() {
  if (scenePositionsPresent) {                    1 bslbf
    Position();
  }
  else {
    [ other position metadata ]
  }
    ... [other object metadata]
    ...
}

WallPhysics() {
  Position();
    ... [other wall metadata]
    ...
}
```

Table 2: Syntax of *ObjectMetadata()* payload and *WallPhysics()* payload

FIG. 9

```
Position(bool forConfig) {
  if (forConfig == 1)
    refOriginIdAdaptation;                                    1 bslbf
    distanceMaxAdaptation;                                    1 bslbf
    coordAddedBits = 2 * bsCoordAddedBits;                    4 uimsbf
    rotAddedBits = 2 * bsRotAddedBits;                        4 uimsbf
  }
  if ((forConfig==0) && (refOriginIdAdaptation==1)) {
    adaptRefOriginId;                                         1 bslbf
  } else {
    adaptRefOriginId = 0;
  }
  if ((forConfig == 1) || (adaptRefOriginId == 1)) {
    if (referenceSceneOriginIdIsZero == 1) {                  1 bslbf
      referenceSceneOriginId = 0;
    } else {
      referenceSceneOriginId;                                 6 uimsbf
    }
  }
  if ((forConfig==0)&&(distanceMaxAdaptation==1)) {
    adaptDistanceMax;                                         1 bslbf
  } else {
    adaptDistanceMax = 0;
  }
  if ((forConfig == 1) || (adaptDistanceMax == 1)) {
    bsDistanceMax;                                            4 uimsbf
  }
  ...
}
```

Table 3: Syntax of *Position()* Payload

FIG. 10a

```
if (translationPresent == 1) {           1 bslbf
  if (forConfig == 1) {
    coordDeltaCoding = 0;
  } else {
    coordDeltaCoding;                    1 bslbf
  }
  if (coordDeltaCoding == 0) {
    coordinateSystem;                    1 uimsbf
    switch (coordinateSystem) {
      case Cartesian:
        bsX;                             6+coordAddedBits uimsbf
        bsY;                             6+coordAddedBits uimsbf
        bsZ;                             6+coordAddedBits uimsbf
        break;
      case Spherical:
        bsAzimuth;                       7+coordAddedBits uimsbf
        bsElevation;                     6+coordAddedBits uimsbf
        bsRadius;                        5+coordAddedBits uimsbf
        break;
    }
...
```

Table 4: Continuation of Syntax of *Position()* Payload

FIG. 10b

```
        } else { /* coordDeltaCoding == 1 */
          switch (coordinateSystem) {
            case Cartesian:
              bsDeltaX;                        2+coordAddedBits uimsbf
              bsDeltaY;                        2+coordAddedBits uimsbf
              bsDeltaZ;                        2+coordAddedBits uimsbf
              break;
            case Spherical:
              bsDeltaAzimuth;                  3+coordAddedBits uimsbf
              bsDeltaElevation;                2+coordAddedBits uimsbf
              bsDeltaRadius;                   1+coordAddedBits uimsbf
              break;
          }
        }
        if (quaternionsPresent==1) {           1 bslbf
          if (forConfig == 1) {
            rotDeltaCoding = 0;
          } else {
            rotDeltaCoding;                    1 bslbf
          }
          if (rotDeltaCoding == 0) {
            bsQ0;                              8+rotAddedBits uimsbf
            bsQ1;                              8+rotAddedBits uimsbf
            bsQ2;                              8+rotAddedBits uimsbf
            bsQ3;                              8+rotAddedBits uimsbf
          } else { /* rotDeltaCoding == 1 */
            bsDeltaQ0;                         4+rotAddedBits uimsbf
            bsDeltaQ1;                         4+rotAddedBits uimsbf
            bsDeltaQ2;                         4+rotAddedBits uimsbf
            bsDeltaQ3;                         4+rotAddedBits uimsbf
          }
        }
      }
     }
    }
```

Table 5: Continuation of Syntax of *Position()* Payload

FIG. 10c

```
ScenePositionsUpdate() {
  for (i=0; i<numSceneOrigins; i++) {
    if (updatePresent) {                    1 bslbf
      SceneOrigin(i+1, forConfig=0);
    }
  }
}
```

Table 6: Syntax of *ScenePositionsUpdate()* payload

FIG. 13

METHOD AND SYSTEM FOR SPATIALLY RENDERING THREE-DIMENSIONAL (3D) SCENES

RELATED APPLICATIONS

This application claims the benefit of priority of U.S. Provisional Application No. 63/376,960 filed Sep. 23, 2022 and U.S. Provisional Application No. 63/376,958 filed Sep. 23, 2022 which is herein incorporated by reference.

FIELD

An aspect of the disclosure relates to a system that may include at least one of an encoder that encodes three-dimensional (3D) scenes into a bitstream, and a decoder that receives the bitstream, decodes the 3D scenes within the bitstream, and spatially renders the 3D scene. Other aspects are also described.

BACKGROUND

Many devices today provide users with the ability to stream media content such as a sound program that may include music, a podcast, a live recorded short video clip, or a feature film over the Internet. For example, a playback device, such as a digital media player that may be electronically coupled (or a part of) an output device, such as a speaker, and may be configured to stream content for playback through the speaker. This content may be selected by users (e.g., through a graphical user interface of the playback device), and streamed from one or more content providers that provide the content on a subscription basis.

SUMMARY

An aspect of the disclosure includes a method (e.g., performed by a decoder side of an audio codec system), the method includes receiving a first bitstream that includes an encoded version of an audio signal for a three-dimensional (3D) scene and a first set of metadata that has 1) a position of a 3D sub-scene within the 3D scene and 2) a position of a sound source associated with the audio signal within the 3D sub-scene; determining a position of a listener within the 3D scene; spatially rendering the 3D scene to produce the sound source with the audio signal at the position of the sound source with respect to the position of the listener; receiving a second bitstream that includes a second set of metadata that has a different position of the 3D sub-scene within the 3D scene; and adjusting the spatial rendering of the 3D scene such that the position of the sound source changes to correspond to movement of the 3D sub-scene from the position of the 3D sub-scene to the different position of the 3D sub-scene within the 3D scene.

In one aspect, spatially rendering includes applying at least one spatial filter to the audio signal based on the position of the sound source with respect to the listener to produce one or more spatially rendered audio signals, where the sound source is produced by using the one or more spatially rendered audio signals to drive at least one speaker of an electronic device. In another aspect, the spatial filter is a head-related transfer function, and the electronic device is a headset, and the one or more spatially rendered audio signals are a set of binaural audio signals for driving a left speaker and a right speaker of the headset. In some aspects, the method further includes: determining that the listener has moved; determining a translation and a rotation of the listener based on the listener's movement; determining a new position of the sound source based on an inverse translation of the translation and an inverse rotation of the rotation with respect to the position of the listener; and adjusting the spatial rendering of the 3D scene based on the new position of the sound source with respect to the position of the listener.

In one aspect, the sound source is a first sound source and the audio signal is a first audio signal, the first bitstream further comprises an encoded version of a second audio signal, the first set of metadata further has a position of a second sound source associated with the second audio signal within the 3D scene such that the spatial rendering of the 3D scene also produces the second sound source with the second audio signal at the position of the second sound source with respect to the position of the listener. In another aspect, the second sound source remains in its position with respect to the position of the listener as either 1) the position of the first sound source changes or 2) the position of the listener changes. In some aspects, the second bitstream further includes encoded versions of the first and second audio signals. In another aspect, the 3D scene is of an audio program, wherein first bitstream is a beginning portion of the audio program and the second bitstream is a subsequent portion of the audio program, where future received bitstreams that include subsequent portions of the audio program do not include the position of the second sound source as metadata.

According to another aspect of the disclosure is an electronic device that includes: at least one processor; and memory having stored therein instructions which when executed by the at least one processor causes the electronic device to: receive a first bitstream that includes an encoded version of an audio signal for a three-dimensional (3D) scene and metadata that has 1) a position of a 3D sub-scene within the 3D scene and 2) a position of a sound source associated with the audio signal within the 3D sub-scene; determine a listener position within the 3D scene; spatially render the 3D scene to produce the sound source with the audio signal at the position of the sound source with respect to the listener position; receive a second bitstream that includes new metadata that has a different position of the 3D sub-scene within the 3D scene; and adjust the spatial rendering of the 3D scene such that the position of the sound source changes to correspond to movement of the 3D sub-scene from the position of the 3D sub-scene to the different position of the 3D sub-scene within the 3D scene.

In another aspect, the electronic device further includes a display, where the memory has further instructions to display, on the display, video content of which the 3D scene audibly represents. In another aspect, the 3D sub-scene represents a structure or a location within the video content and the audio signal includes a sound associated with the structure or the location. In some aspects, the position of the 3D sub-scene corresponds to a position of the structure or the location such that the 3D sub-scene moves as the structure or the location moves within the video content. In one aspect, the video content is an extended reality (XR) environment, wherein the structure or the location and the position of the listener are within the XR environment In another aspect, spatially rendering the 3D scene includes producing a set of binaural audio signals by applying a head-related transfer function to the audio signal based on the position of the sound source with respect to the listener position.

According to another aspect of the disclosure is a non-transitory machine-readable medium having instructions stored therein which when executed by at least one processor of an electronic device causes the electronic device to: receive a first bitstream that includes an encoded version of an audio signal for a three-dimensional (3D) scene and metadata that has 1) a position of a 3D sub-scene within the 3D scene and 2) a position of a sound source associated with the audio signal within the 3D sub-scene; determine a listener position within the 3D scene; spatially render the 3D scene to produce the sound source with the audio signal at the position of the sound source with respect to the listener position; receive a second bitstream that includes new metadata that has a different position of the 3D sub-scene within the 3D scene; and adjust the spatial rendering of the 3D scene such that the position of the sound source changes to correspond to movement of the 3D sub-scene from the position of the 3D sub-scene to the different position of the 3D sub-scene within the 3D scene.

In one aspect, the sound source is a first sound source, the metadata further has 1) a position of a second sound source within the 3D scene and 2) a set of acoustic parameters associated with the second sound source, wherein the spatial rendering of the 3D scene includes a sound of the audio signal originating at the position of the second sound source based on the set of acoustic parameters. In another aspect, spatial rendering the 3D scene includes: determining an audio filter based on the set of acoustic parameters; producing a filtered audio signal by applying the audio filter to the audio signal; and producing one or more spatially rendered audio signals by applying one or more spatial filters to the audio signal and the filtered audio signal.

In one aspect, the non-transitory machine-readable medium has further instructions to display, on a display, a visual environment of which the 3D scene audibly represents, the second sound source is a reflective or diffractive sound source that produces the sound of the audio signal as being reflected or diffracted off an object within the visual environment. In another aspect, the set of acoustic parameters comprises at least one of a level of diffuseness, a cutoff frequency, a frequency response, a geometry of the object, an acoustic surface parameter of the object, a reflectivity value, an absorption value, and a material of the object. In some aspects, spatially rendering the 3D scene includes producing a set of binaural audio signals by applying a head-related transfer function to the audio signal based on the position of the sound source with respect to the listener position.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

FIG. 8 shows a table of an enhancement to bitstream syntax of MPEG-D DRC according to some aspects.

FIG. 9 shows another table of enhancement to bitstream syntax of MPEG-D DRC according to some aspects.

FIGS. 10a-10c show several tables of enhancement to bitstream syntax of MPEG-D DRC according to some aspects.

FIG. 13 shows another table of enhancement to bitstream syntax of MPEG-D DRC according to some aspects.

DETAILED DESCRIPTION

Figure 1:
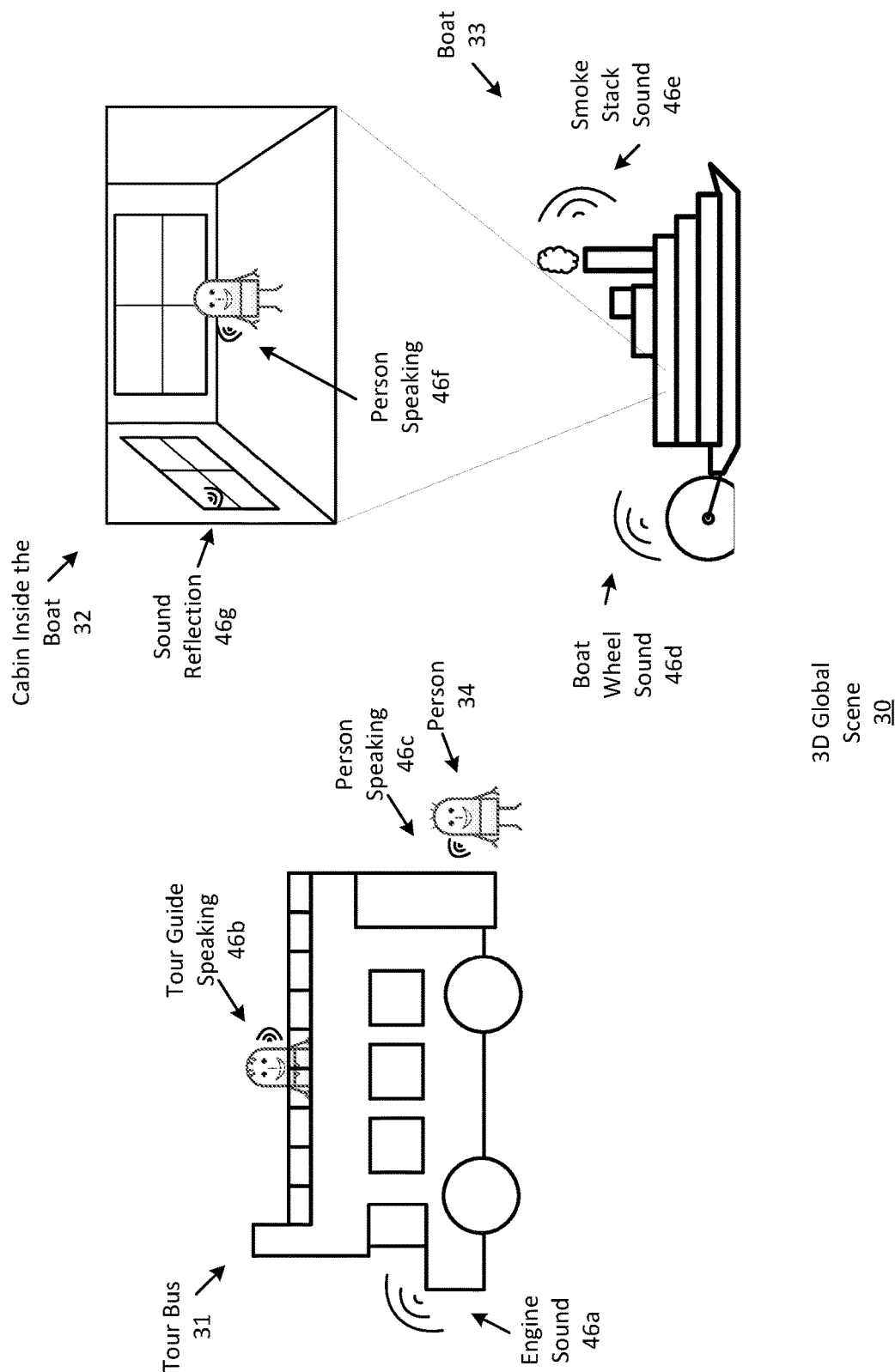
FIG. 1 illustrates an example of a three-dimensional (3D) scene of a media program according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

As used herein, an extended reality (XR) environment (or presentation) may refer to a wholly or partially simulated environment that people sense and/or interact with via one or more electronic systems. For example, the XR environment may include augmented reality (AR) content, mixed reality (MR) content, virtual reality (VR) content, and/or the like. There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

As referenced herein, a "media program" may be (and include) any type of media content, such as an audio program that may include audio content (e.g., as one or more audio signals having audio data). For example, an audio program may include a musical composition, a podcast, audio of an XR environment, a sound track of a motion picture, etc. In another aspect, a media program may be an audio/video (A/V) program that includes audio content and/or video content (e.g., as one or more video signals having video (or image) data), etc. An example of an A/V program may include a motion picture, which includes video or image content of the motion picture and the (e.g., an accompanying audio program that includes the) sound track of the motion picture. As another example, an A/V program may include audio content and video content of an XR environment. In one aspect, a media program may include one or more audio components (or sound sources), each associated with (or having) one or more audio signals of the program. For instance, an audio program of a sound track of a motion picture may include an audio component of a voice track of a person within a scene and may include another audio component of barking of a dog within the scene. As another example, one audio component may be dialog while another audio component may be a score of the motion picture. As yet another example, an audio program may include multiple sound tracks (e.g., of a musical album or of a motion picture series), an audio component may be an individual sound track and/or may represent the entire group (or album) of sound tracks. In some aspects, a media program may be a program file (e.g., of any type) that is configured to include audio content and/or video content, as described herein.

In one aspect, an audio program may include audio content for spatial rendering as one or more data files in one or various (e.g., 3D) audio formats, such as having one or more audio channels. For instance, an audio program may include a mono audio channel or may be a multi-audio channel format (e.g., two stereo channels, six surround source channels (in 5.1 surround format), etc.). In another aspect, the audio program may include one or more audio objects, each having at least one audio signal, and positional data (for spatially rendering the object's audio signals) in 3D sound. In another aspect, the media program may be represented in an ambisonics format, such as a first-order or higher order ambisonics (HOA) audio format.

In one aspect, a media program may include one or more 3D scenes, each of which may represent one or more portions (or segments) of the media program. For example, an audio program may include one or more 3D scenes as (e.g., one or more sound segments of) one or more audio signals, where each 3D scene may include (or may be characterized by) one or more audio scene components or elements, such as sound sources that are positioned (and originate from) within the 3D scene. For example, a 3D scene of a virtual living room (e.g., of an XR environment) may include dialog of a person within the room as one sound source (e.g., audio component) positioned at one location within the virtual living room, while sound of a dog barking may be positioned elsewhere within the room (e.g., originating from a virtual dog) as another sound source. As a result, when audio content of a 3D scene is spatially rendered, a listener may perceive the sound sources as originating from particular locations within an acoustic (e.g., physical) space (e.g., about the listener), which may correspond to that of the 3D scene (e.g., which may correspond to the locations within the virtual living room as if the listener were physically in the living room, as described in the example above). In another aspect, an A/V program may include one or more 3D scenes as video content, where each 3D scene may include one or more visual objects (structures or locations). Thus, as described herein, a 3D scene may represent a 3D space that may include (positioned therein) sound sources and/or visual objects, where the 3D scene may be rendered such that a user (listener) may perceive at least a portion of the 3D space from one or more perspectives.

FIG. 1 illustrates an example of a 3D global scene 30 (or 3D scene) of a media program according to one aspect. In particular, this figure is showing the 3D scene 30 that includes a tour bus 31, a person 34 who is standing next to the tour bus 31, a boat 33, and a cabin 32 inside the boat 33 that has a person standing next to several windows. In one aspect, this 3D scene may be a part of an A/V program, such as an XR environment, where the 3D scene includes a visual (e.g., virtual) environment with the listed elements, as well as including audio components of the visual environment, were a listener may perceive the sounds within the 3D global scene 30 from various listener locations within the scene. For example, the 3D scene 30 may include several audio components as sound sources 46a-46g (each shown has have three curved lines that may represent sound originating from the source). For example, the tour bus's engine is making an engine sound 46a (e.g., engine noises), a tour guide on the top deck of the tour bus 31 is speaking 46b, and the person 34 is speaking 46c to the tour guide; the smoke stack of the boat 33 is making sound 46e and the boat wheel that is propelling the boat 33 is making sound 46d as it spins in the water; and the person inside the cabin 32 is speaking 46f and within the cabin is a sound reflection 46g (of the person speaking) off of a window in the cabin.

In one aspect, when the 3D scene is spatially rendered, the positions of the sound sources may be perceived by a listener based on the listener's position and orientation within the 3D scene 30. For example, if a listener position were facing the back of the tour bus 31, the sound sources of the tour bus 31 (e.g., the engine sound 46a) and the person 34 may be spatially rendered to originate in front of the listener, while the sound sources of the boat 33 (e.g., the boat wheel should 46d and the smoke stack sound 46e) may be spatially rendered to be perceived behind the listener. More about sound sources within the 3D scene 30 are described herein.

As shown herein, the 3D scene 30 may include a visual (3D) environment, as shown, and an audible (3D) acoustic space that represents sounds of the visual environment. In another aspect, a 3D scene may include audio components without associated video content, such as the case when the media program may be a musical composition.

With the 3D scene 30, it is important to manage or keep track of the relationships between the sound sources and a listener position (not shown) within the 3D scene in order to spatially render the 3D scene effectively and efficiently to the listener. This may be the case when the listener position and/or sound source positions move within the 3D global scene 30. For example, a listener position next to the person 34 may remain stationary, while the tour bus 31 and/or the boat 33 may move away from the position as the media program plays.

A scene graph is a data structure that arranges objects as a collection of nodes in a graph, where the locations of the objects within the graph define hierarchical relationships between the objects. Such graphs have been used for vector-based graphics editing applications, where each node of the graph may be associated with a graphical object in relation to either other nodes within the graph, or to a single parent node to which all of the nodes are coupled. In one aspect, a scene graph may be used in audiovisual media to describe object locations. In particular, a scene graph may describe locations of audio objects (e.g., within a virtual acoustic environment), and may be used to spatially render the audio objects at their locations with respect to a location of a listener.

The use of scene graphs for describing locations of (audio) objects (e.g., sound sources), however, have disadvantages. As described herein, a scene graph is a data structure that may describe relationships between one or more (child) nodes and a single parent node. Each node (and parent) within the data structure may require specific data for linking (and describing characteristics) the nodes to each other and to the parent. Such a data structure may use and require a significant amount of data and therefore may be ineffective in situations when computer memory is at a limited capacity. In addition, the use of such data structures may be inefficient where the data structure is to be transmitted between electronic devices (along with its associated media) in low-bitrate situations (which may especially be the case when a media program along with the data structure are to be live or real-time streamed from one device to one or more other devices). As a result, there is a need for a scene tree structure that may be efficiently coded by an encoder-side device as scene metadata in a bitstream (along with media, such as audio data) that is transmitted to a decoder-side for use in spatially rendering audio data of the bitstream.

To solve this problem, the present disclosure provides an audio codec system that efficiently encodes one or more audio signals of an audio program and encodes scene metadata (which may be referred to as "metadata" hereafter) as a scene tree structure into a bitstream at an encoder side (or encoder-side device), and a decoder side (or decoder-side device) that receives the bitstream and uses the encoded metadata to spatially render the audio signals. Specifically, the encoder side (which may be implemented by a programmed processor, e.g., one or more processors that execute or are configured by instructions stored in memory as part of the encoder-side device), receives an audio program that includes an audio signal associated with a sound source that is within a 3D scene of the audio program. For example, the audio program may be a musical composition, where the sound source is a sound (e.g., vocals) that originates from a particular direction with respect to an origin of the 3D scene. The encoder side encodes the (e.g., audio program of the) audio signal into a bitstream and encodes into metadata of the bitstream as a scene tree structure that includes an origin of a first 3D scene (e.g., a 3D sub-scene) relative to an origin of a second 3D scene (e.g., the 3D global scene 30). The encoder side also encodes a position of the sound source relative to the origin of the first 3D scene, the position referencing the origin using an identifier. The encoded the scene tree structure may define an initial configuration of the sound source with respect to the first and second 3D scenes such that the sound source may be rendered by a decoder-side device. In particular, the scene tree structure defines the initial configuration, such that when the decoder-side begins to spatially render the audio program (e.g., when the audio program is played back from a (e.g., starting) point along a playback duration), it may do so such that the sound source originates from its position (e.g., with respect to a listener's position) within the first 3D scene. The encoder-side device then transmits the bitstream to the decoder-side device. In one aspect, such a scene tree structure, which uses an identifier to reference the origin of the first 3D scene in which the sound source is located, along with other encoding aspects associated with the tree structure described herein, reduce the amount of data needed to spatially describe the 3D scene while still describing the relationships between sound source and their respective origins in great detail. As a result, in cases that include a limited capacity for storage or transmission of media content, the encoding method described herein describes locations that result in a minimum amount of data. Due to a limited capacity, there is usually a tradeoff between bitrate efficiency of the description and experienced quality of a media presentation, which means that the highest bitrate efficiency will provide the best overall result. The present disclosure allows an efficient way of encoding 3D positions in a 3D scene at a low bitrate for media applications.

Figure 2:
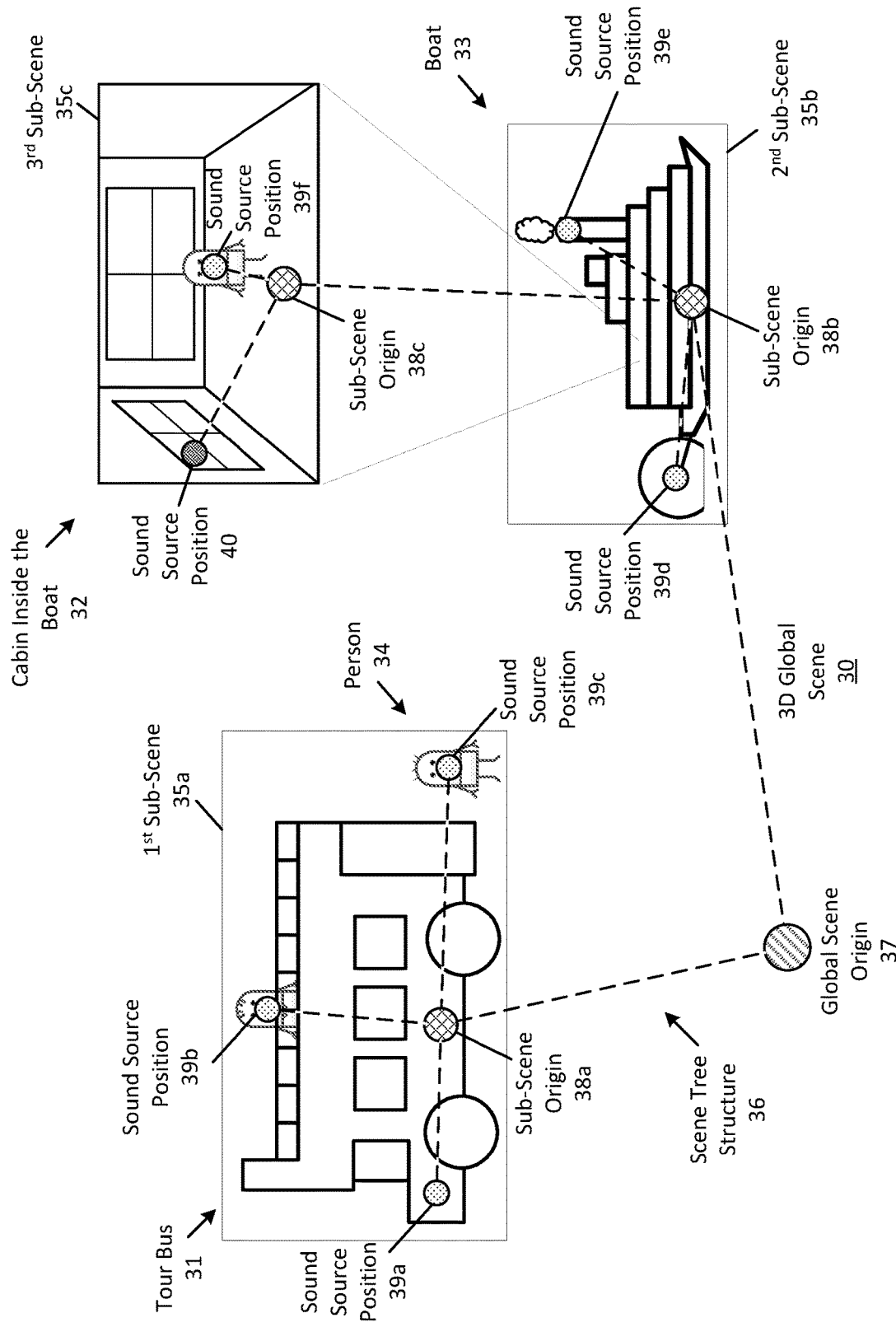
FIG. 2 shows the 3D scene from FIG. 1 and a scene tree structure that defines relationships between positions of elements (e.g., origins associated with 3D sub-scenes) within the 3D scene according to one aspect.

FIG. 2 shows the 3D global scene 30 from FIG. 1 and a scene tree structure 36 that defines relationships between positions of audio components (e.g., sound sources) within the 3D scene 30 (e.g., which may be associated with visual elements within the scene) according to one aspect. Specifically, this figure is showing the scene tree structure 36 that may be produced (e.g., and encoded into a bitstream) by the (e.g., encoder side of the) audio codec system described herein to manage position information of origins of one or more 3D scenes within the 3D global scene 30 of an audio program to which one or more sound sources relate, for use in spatially rendering the audio program, as described herein. In particular, the tree structure 36 may be (or include) a scene position payload within the bitstream that includes several leaves (or nodes), where each leaf within the tree structure may include a position (e.g., having positional data) of a position of a 3D sub-scene, from which one or more sound sources within the 3D scene relate to one another and/or to the scene as a whole. More about encoding positions within a 3D scene within a bitstream as a scene tree structure is described herein.

As shown, the 3D global scene 30 includes several 3D sub-scenes 35a-35c, each being a separate 3D scene within the (e.g., global) 3D scene 30 and may have one or more associated sound sources (located within). In one aspect, a 3D sub-scene may represent a structure or a location within video content of a media program, where one or more audio signals of the media program include a sound (e.g., sound source) associated with the structure or the location). For instance, the 3D scene 30 includes a first sub-scene 35a of (e.g., that includes or is associated with) the tour bus 31 and the person 34, a second sub-scene 35b of the boat 33, and a third sub-scene 35c of the cabin 32 inside the boat 33. In one aspect, each sub-scene may include positions of sound sources. In this case, each of the sub-scenes may include positions of sound sources that are associated with visual objects within each sub-scene. For example, the first 3D sub-scene 35a includes sound sources positions (or origins) 39a-39c of sound sources 46a-46c, respectively, the second 3D sub-scene 35b includes sound source positions 39d and 39e of sound sources 46d and 46e, respectively, and the third 3D sub-scene 35c includes sound source positions 39f and 40 of sound sources 46f and 46g, respectively.

As described herein, the present disclosure provides the scene tree structure 36 that describes positions of sub-scenes with respect to one another or the 3D global scene. In particular, the structure includes one or more of 3D sub-scene positions within the global 3D scene, where each of the positions of the 3D sub-scenes may be defined with respect to reference points (e.g., origins) of one or more other 3D sub-scenes and/or the global scene. In particular, the scene tree structure may include position data (information) about each of the origins it represents, where the position data of one origin is with respect to another origin. In one aspect, positions of the (e.g., origins of the) sub-scenes 35a and 35b are with respect to the global scene origin 37 of the 3D global scene 30. For example, the position of sub-scene origin 38a of the first sub-scene 35a is with respect to the global scene origin 37, and the position of the sub-scene origin 38b of the second sub-scene 35b is with respect to the global scene origin 37. In another aspect, an origin of a sub-scene may be with respect to another sub-scene (and/or sound source) position. For example, the position of the sub-scene origin 38c is with respect to the sub-scene origin 38b of the sub-scene 35b. This may be due to the fact that the inside of the cabin 32 is a part of (or associated with) the boat 33. Thus, any movement of a sub-scene, which corresponds to the sub-scene's origin would be with respect to the sub-scene origin to which it references, which in this case would be origin 38b. More about moving sub-scene origins is described herein.

This figure also shows positions of sound sources that relate to origins of sub-scenes. In particular, the sound source positions 39a-39c of respective sound sources 46a-46c are (e.g., defined within the tree structure) with respect to a sub-scene origin 38a of the first sub-scene 35a, sound source positions 39d and 39e of respective sound sources 46d and 46e are with respect to a sub-scene origin 38b of the second sub-scene 35b, and sound source positions 39f and 40 of respective sound sources 46f and 46g are defined with respect to a sub-scene origin 38c of the third sub-scene 35c. In one aspect, a position of a sound source may be with respect to the global scene origin. As described herein, by defining the positions of sound sources with respect to an origin of the scene tree structure, an audio renderer may be configured to spatially render sound sources with respect to a listener position, based on the listener position with respect to one or more origins of the structure. More about rendering is described herein.

In one aspect, the 3D scene may have different types of sound sources, positions of which are defined by the scene tree structure 36. For example, the sound sources 46a-46f may be "active" sound sources, meaning that they are each producing sound of one or more audio signals associated with the sources. For example, to produce the sound of the tour bus engine 46a, the audio program may include audio data (as one or more audio signals) that include one or more sounds associated with the sound of an engine, which when spatially rendered according to its position (with respect to a listener position), a listener perceives the sound of the engine at position 39a. In another aspect, an active sound source may be defined based on a (e.g., visual) object within the 3D scene. In particular, an active source (e.g., produces sound that) may represent sound produced by an object (or location) within video content of the media program, which is arranged (e.g., in a real physical environment) to produce sound, such as a running engine would produce sound in the physical world. In another aspect, the 3D scene may have other sound sources, such as the sound source 46g that is a "passive" sound source, meaning that it produces reflected or diffracted sound produced from one or more active sound sources. For instance, a passive sound source may be a reflective surface, which as illustrated is a window, that is arranged (e.g., in the physical world) to reflect or diffract sound. As an example, the passive sound source in the cabin 32 may be arranged to produce reflective or diffractive sound of speech 46f of the person within the cabin as the person is talking. More about passive and active sound sources are described herein.

In one aspect, the scene tree structure may enable for efficient encoding of sub-scene origins and provide accurate rendering of sound source positions within the 3D scene 30. For example, when the scene tree structure is used by an audio renderer on a decoder side to spatially render audio content of an XR environment, the audio renderer may adjust spatial rendering based on a listener's position within the XR environment. For instance, in an XR environment, a (e.g., avatar of a) listener may be able to approach sound sources or move away from them. Therefore, position information should be provided with sufficient resolution, even when the listener approaches a sound source up to a shortest permitted distance. Moreover, considering the boat 33 leaving port and being audible in a distance of a few kilometers, conventional distance coding based on only a global reference point may need a resolution better than one meter to allow for accurate rendering if the listener position has boarded the boat as opposed to staying at port. For large distances, coding of sound source positions relative to only a reference point (e.g., within the 3D global scene) is therefore not the most efficient method. Therefore, the present disclosure provides a scene tree structure that includes positional data of origins, such as defining the position of the boat as a sub-scene position origin with respect to the global scene origin 37. This also allows for the encoder side to encode sound source positions relative to the sub-scene origin within the scene tree structure.

In another aspect, the present disclosure provides an encoding method that reduces redundancy for positions within a 3D scene (e.g., in order to be more effective in a low-bitrate system). For example, conventional distance coding methods update positions of sound sources with respect to a reference point within the 3D scene. Some sound sources, however, may share (or be a part of) a common sub-scene. For example, sound sources 46d and 46e are associated with the boat 33. As the boat moves, its associated sound sources may also move with respect to a reference point within the 3D global scene, but remain static with respect to a reference point (e.g., origin) associated with the boat. Since these sources share the same movement with the boat, there is significant redundancy in the individual updates for each of the sound sources. The present disclosure reduces (or eliminates) that redundancy by having sound sources relate to sub-scene origins, which provide a more efficient and intuitive coding method.

As described herein, the decoder side (which may be implemented as (or by) a programmed processor of a decoder-side device) obtains the bitstream that includes the encoded audio signal and the encoded scene tree structure that defines the initial configuration of the 3D scene. The decoder side determines a position of a listener with respect to the origin of the 3D scene. In one aspect, the "listener position" may relate to a location and/or orientation within a 3D scene that an audio renderer may use to spatially render sound sources of the 3D scene so that a listener may spatially perceive the sound of the sound sources as if the listener were at the listener position. In particular, the listener may be positioned at the origin itself, or may be positioned somewhere within the 3D scene. For example, referring to FIG. 2, the listener position may be positioned within the 3D scene 30 (e.g., adjacent to the tour bus 31, or may be within the tour bus itself (e.g., sitting on the top deck). In the case in which the 3D scene is of (or represents) an XR environment, the position of the listener may correspond to a position of the listener's avatar within the XR environment. The decoder side produces a set of spatially rendered audio signals by spatially rendering the audio signal according to the position of the sound source with respect to the position of the listener. To do so, the decoder side may determine the relationship between the listener's position and the origin, from which, the decoder may determine the position of the sound source with respect to the listener. Returning to the previous example in FIG. 2, the decoder side may determine the position 39a of the tour bus engine with respect the origin 38a, using position data from the tree structure 36, and may determine the listener's position with respect to the origin 38a (e.g., based on the listener's position with respect to the global origin 37), and knowing that relationship, the decoder may determine the position of the sound source with respect to the listener. The decoder side may use the rendered audio signals to drive one or more speakers to produce the sound source. Thus, the decoder side may effectively and efficiently use the scene metadata to spatially render the sound source for the listener.

In addition, the present disclosure may provide efficient encoding for position updates. As described herein, the audio codec system may produce the tree scene structure that defines an initial configuration of audio component positions within a 3D scene, which an audio renderer (of a decoder-side device) may use the positions to spatially render the audio components. Some sub-scenes within the 3D scene, however, may be dynamic such that they move within the 3D scene (e.g., with respect to the 3D scene's origin). For example, turning to FIG. 2, the boat 33 may be moving (e.g., with respect to the global scene origin 37). In which case, sound source positions associated with the boat (e.g., 39d and 39e) may remain static with respect to the (e.g., sub-scene origin 38b of the sub-scene 35b of the) boat 33, as described herein. Thus, the encoder-side of the audio codec system may be configured to provide a position update for the (e.g., sub-scene origin 38b of the) boat 33, without other positional data, such as positional data of sub-scene origin 38a or positional data of any of the boat's sound sources (which may have also been provided with the initial configuration), since they have remained static with respect to the origin 38b.

In particular, the present disclosure describes an encoder-side method that receives an audio signal of an audio program that may be received from or through a media application, where the audio signal is for a 3D scene of the audio program and determines that there is a 3D sub-scene within the 3D scene. Referring to FIG. 2, the encoder side may determine that the boat 33 is a sub-scene 35b based on a determining that it is associated with sound sources (e.g., a sound of the ship wheel and a sound of the smoke stack). More about determining that the 3D scene includes a sub-scene is described herein. The encoder side determines 1) a position of the 3D sub-scene within the 3D scene (e.g., by determining a position of the sub-scene's origin) and 2) a position of a sound source for the audio signal within the 3D sub-scene (e.g., with respect to the sub-scene's origin). The encoder side produces a first bitstream by encoding the audio signal and including a first set of metadata that has the position of the 3D sub-scene and the position of the sound source (e.g., as an initial configuration of the 3D scene). The encoder side determines that the position of the 3D sub-scene has changed. For example, the encoder side may determine that the sub-scene 35b has moved based on movement of the boat (e.g., indicated by the audio program). The encoder side produces a second bitstream that includes the encoded audio signal and a second set of metadata that has the changed position of the 3D sub-scene. Thus, the encoder side may reduce the required bitrate by transmitting positional updates for sound source (and/or sub-scene) positions within the 3D scene, while omitting position data of static sources and sub-scenes. To describe the motion of audio components within a moving sub-scene, it is sufficient to dynamically update the position of the sub-scene, rather than having to update positions of all of the audio components.

The present disclosure describes a decoder-side method for spatially rendering 3D scenes based on position updates, as described herein. For example, the decoder side receives a first bitstream that includes an encoded version of an audio signal for a 3D scene and a first set of metadata that has 1) a position of a 3D sub-scene within the 3D scene and 2) a position of a sound source associated with the audio signal within the 3D sub-scene. The decoder side determines a position of a listener within the 3D scene (e.g., where the listener position may be with respect to a global scene origin or with respect to a sub-scene origin, when the listener is located within a sub-scene). The decoder side spatially renders the 3D scene to produce the sound source with the audio signal at the position of the sound source with respect to the position of the listener. The decoder side receives a second bitstream that includes a second set of metadata that has a different position of the 3D sub-scene within the 3D scene, and adjusts the spatial rendering of the 3D scene such that the position of the sound source changes to correspond to movement of the 3D sub-scene form the original position of the 3D sub-scene to its new position. Thus, the decoder side is configured to adjust the position of sound sources with respect to movement of their associated sub-scene, using position updates of the sub-scene.

Figure 3:
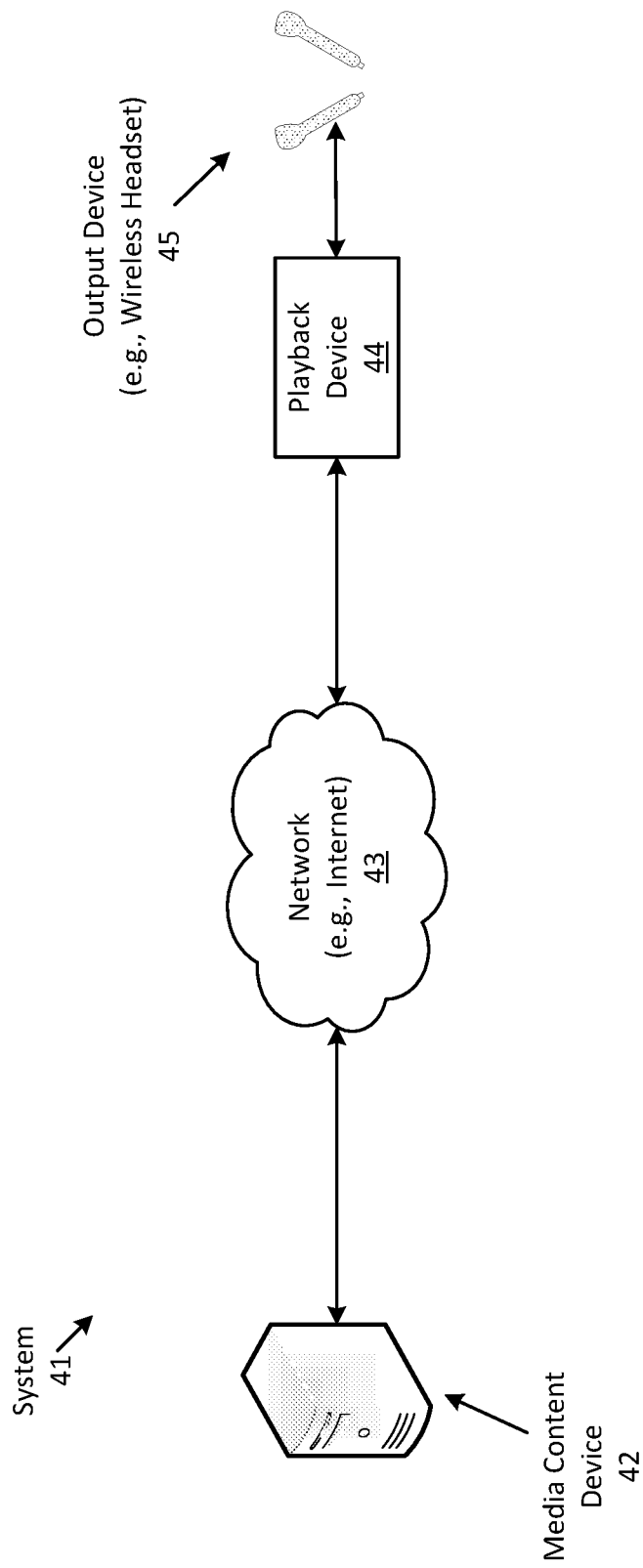
FIG. 3 shows a system that produces a bitstream that includes encoded metadata for spatially rendering 3D scenes.

FIG. 3 shows a system 41 (e.g., an audio system) that produces a bitstream that includes encoded (e.g., scene) metadata for spatially rendering a 3D scene of an audio program. Specifically, the system includes a playback (or audio playback) device 44, an output (or audio output) device 45, a (e.g., computer) network 43 (e.g., the Internet), and a media content device (or server) 42. In one aspect, the system 41 may include more or fewer elements, such as having one or more (additional) servers, or not including a playback device. In which case, the output device may be (e.g., directly) communicatively coupled to the media content device, as described herein.

In one aspect, the media content device 42 may be a stand-alone electronic server, a computer (e.g., desktop computer), or a cluster of server computers that are configured to perform digital (audio) signal processing operations, as described herein. In particular, the content device may be configured to produce (and/or) receive media (e.g., audio, video, and/or audio/video (A/V)) programs (which may include one or more audio components), and may be configured to perform encoder-side operations as described herein to produce a bitstream with the encoded audio program and with associated metadata (or scene metadata). As shown, the media content device 42 is communicatively coupled (e.g., via the network 43) to the playback device 44 in order to provide digital audio data and metadata, using an encoded bitstream. More about the operations performed by the media content device 42 is described herein.

In one aspect, the playback device 44 may be any electronic device (e.g., with electronic components, such as a processor, memory, etc.) that is capable of performing decoding operations upon a bitstream to decode an encoded audio signal and extract metadata associated with the audio signal, and perform audio signal processing operations upon the decoded audio signal according to the extracted metadata. In another aspect, the playback device may be capable of spatially rendering audio signal using one or more spatial filters (such as head-related transfer functions (HRTFs)) for spatial audio playback (e.g., via one or more speakers that may be integrated within the playback device and/or within the output device, as described herein). In another aspect, the playback device may be configured to perform at least some encoder-side operations, as described herein. In some aspects, the playback device may be a desktop computer, a laptop computer, a digital media player, etc. In one aspect, the device may be a portable electronic device (e.g., being handheld operable), such as a tablet computer, a smart phone, etc. In another aspect, the device may be a head-mounted device, such as smart glasses, or a wearable device, such as a smart watch.

In one aspect, the output device 45 may be any electronic device that includes at least one speaker and is configured to output (or playback) sound by driving the speaker with one or more (e.g., spatially rendered) audio signals. For instance, as illustrated the device is a wireless headset (e.g., in-ear headphones or wireless earbuds) that are designed to be positioned on (or in) a user's ears, and are designed to output sound into the user's ear canal. In some aspects, the earbuds may be a sealing type that has a flexible ear tip that serves to acoustically seal off the entrance of the user's ear canal from an ambient environment by blocking or occluding in the ear canal. As shown, the output device includes a left earbud for the user's left ear and a right earbud for the user's right ear. In this case, each earbud may be configured to output at least one audio channel of audio content (e.g., the right earphone outputting a right audio channel and the left earphone outputting a left audio channel of a two-channel input of a stereophonic recording, such as a musical work). In another aspect, each earbud may be configured to playback one or more spatially rendered audio signals. In which case, the output device may playback binaural audio signals produced using one or more HRTFs, where the left earbud plays back a left binaural signal, while the right earbud plays back a right binaural signal. In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In some aspects, the output device 45 may be a head-worn device, as illustrated herein. In another aspect, the output device 45 may be any electronic device that is arranged to output sound into an ambient environment. Examples may include a stand-alone speaker, a smart speaker, a home theater system, or an infotainment system that is integrated within a vehicle.

As described herein, the output device 45 may be a wireless headset. Specifically, the output device 45 may be a wireless device that may be communicatively coupled to the playback device 44 in order to exchange digital data (e.g., audio data). For instance, the playback device 44 may be configured to establish the wireless connection with the output device 45 via a wireless communication protocol (e.g., BLUETOOTH protocol or any other wireless communication protocol). During the established wireless connection, the playback device 44 may exchange (e.g., transmit and receive) data packets (e.g., Internet Protocol (IP) packets) with the output device 45, which may include audio digital data in any audio format.

In another aspect, the playback device 44 may communicatively couple with the output device 45 via other methods. For example, both devices may couple via a wired connection. In this case, one end of the wired connection may be (e.g., fixedly) connected to the output device 45, while another end may have a connector, such as a media jack or a universal serial bus (USB) connector, which plugs into a socket of the playback device 44. Once connected, the playback device 44 may be configured to drive one or more speakers of the output device 45 with one or more audio signals, via the wired connection. For instance, the playback device 44 may transmit the audio signals as digital audio (e.g., PCM digital audio). In another aspect, the audio may be transmitted in analog format.

In some aspects, the playback device 44 and the output device 45 may be distinct (separate) electronic devices, as shown herein. In another aspect, the playback device 44 may be a part of (or integrated with) the output device 45. For example, at least some of the components of the playback device 44 (such as one or more processors, memory, etc.) may be part of the output device 45, and/or at least some of the components of the output device 45 may be part of the playback device. In which case, at least some of the operations performed by the playback device 44 may be performed by the output device 45. For example, the output device 45 may be configured to perform one or more decoder-side operations described herein to decode a received bitstream for spatially rendering audio content using metadata of the received bitstream.

Figure 4:
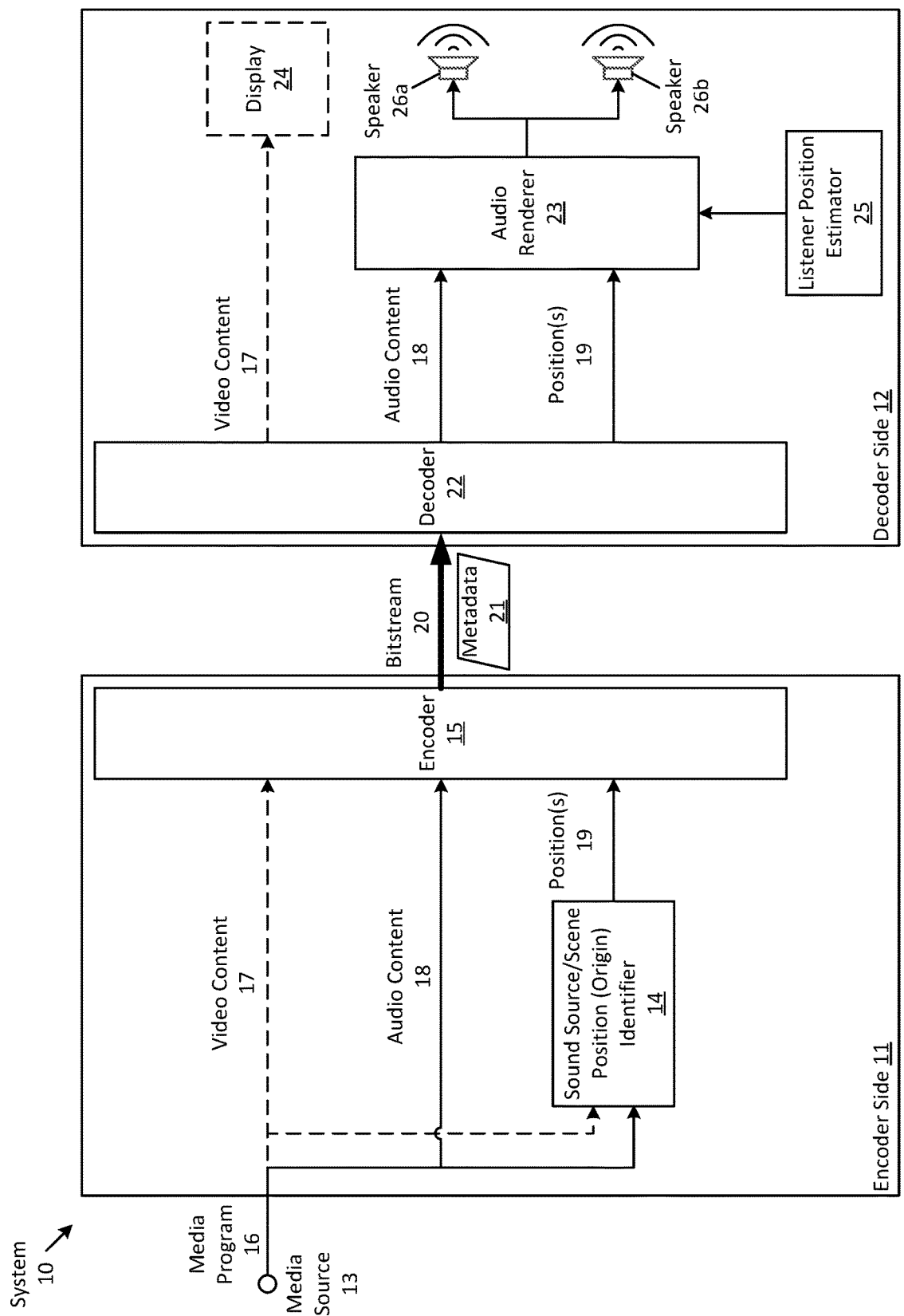
FIG. 4 is a block diagram of an audio coded system that produces a bitstream of encoded audio contend and scene metadata at an encoder side, and receives the bitstream and uses the scene metadata to spatially render the audio content from within the bitstream at a decoder side according to one aspect.

FIG. 4 is a block diagram of the audio codec system 10 (or system) described herein that produces a bitstream of encoded audio content and scene metadata at an encoder side, and receives the bitstream and uses the scene metadata to spatially render the audio content at a decoder side according to one aspect. The system 10 includes a media source 13, an encoder side 11, and a decoder side 12. In one aspect, the media source 13 may be any type of electronic device (e.g., the media content device 42) from which the system 10 receives a media program 16 (e.g., an audio program, such as a musical composition). In another aspect, the media source may be (e.g., internal) memory of the encoder-side device.

In one aspect, the encoder side 11 may be implemented by one or more processors that execute or are configured by instructions stored in memory generically referred to here as "a programmed processor", for example in one or more (encoder-side) devices. For instance, the encoder side may be implemented by the media content device 42 and/or may be implemented by one or more servers that are communicatively coupled to one or more devices via the Internet. The decoder side 12 that may be implemented by a programmed processor by one or more (decoder-side) devices, such as the playback device 44 and/or the output device 45 of system 41.

In one aspect, the audio codec system 10 may perform operations for encoding and decoding audio data and/or metadata of an audio program in real-time. In which case, the digital signal processing operations described herein may be continuously (e.g., periodically) performed upon a stream of audio data of a media program. In particular, the operations may be performed from a beginning of the media program (or a starting time at which the media program is to be streamed) to an end of the media program (or a stopping time at which the media program is no longer streamed in real-time). In some aspects, the operations may be performed periodically such that the audio codec system performs the operations for one or more segments of the media program that is being received and streamed for playback at a decoder-side device.

The encoder side 11 will now be described. The encoder side 11 receives a media program that includes (e.g., optional) video content 17 (e.g., as one or more video signals) and audio content 18 (e.g., as one or more audio signals), where the audio content may include one or more audio components that are associated with (e.g., being a part of or making up) a 3D (e.g., acoustic) scene of the media program. In one aspect, the video content 17 may be optionally received (as illustrated as being associated with dashed lines). For instance, the media program may be an audio program which only includes audio content 18. In one aspect, the media program may include data associated with the audio (and/or video) content. For example, the program may include spatial parameters (e.g., spatial characteristics) associated with the audio components. For example, an audio component may be an audio object, the program may include one or more audio signals of the object and include spatial parameters that indicate the position of the (e.g., sound source within the 3D scene associated with) the object for spatially rendering the audio object. In another aspect, the program may include additional data, such as acoustic parameters that may be associated with one or more sound sources of the program. More about acoustic parameters is described herein.

As shown, the encoder side 11 includes several operational blocks to perform one or more digital signal processing operations described herein. For instance, the encoder side 11 includes a sound source/scene position (e.g., origin of the scene) identifier 14 (hereafter referred to as "identifier") and an encoder 15. The identifier 14 may be configured to identify sound sources within one or more 3D scenes of the media program. In one aspect, the identification may be based on a performance of spectral analysis (e.g., blind source separation (BSS)) upon the audio content of the program to identify one or more sound sources (e.g., as one or more audio signals) in the 3D scene of the program. In another aspect, the identifier may use any type of digital signal processing operations upon (e.g., one or more audio signals of) the program to identify sound sources contained within.

In another aspect, the identification of sound sources may be based on information (e.g., data) within the program. For instance, the program may include one or more audio objects, each object associated with a sound source of the program. In another aspect, the program may include data (e.g., metadata) that indicates the presence of one or more sound sources within a 3D scene of the program. More about identifying sound sources through data of the program is described herein.

In one aspect, the identifier 14 may be configured to determine positions of the identified sound sources within the 3D scene. In particular, the identifier may determine positions within the scene with respect to a reference point (e.g., a global scene origin, such as origin 37 in FIG. 2) within the 3D scene. In some aspects, the global scene origin may be at an origin of a coordinate system (e.g., in Cartesian coordinates, the location may be x=0, y=0, and z=0). Thus, the identified positions may include coordinates of a coordinate system and/or may include rotational parameters that may indicate the orientation of the sound sources (with respect to an origin). In one aspect, the position of the sound sources may be based on data received within the media program. For instance, when the media program includes one or more audio objects, the objects may include position information, which the identifier may use to determine their position within the 3D scene. In another aspect, the identifier may perform a sound localization function to determine the position of an identified sound source.

As described thus far, the identifier may perform an acoustic analysis (e.g., spectral analysis) upon audio data of the media program to identify one or more sound sources and/or source positions/orientations within a 3D scene. In one aspect, this may be the case when the media program is an audio program (e.g., having only audio content). In another aspect, the identifier may be configured to perform (e.g., in addition or in lieu of the acoustic analysis) one or more operations to identify sound sources (and/or their positions/orientations) based on video content of the media program (e.g., A/V program). For instance, the identifier may perform an image analysis function (e.g., an object recognition algorithm) upon video content of the program to identify objects within a 3D scene that may be associated with sound sources. For example, referring to FIG. 1, the identifier may determine that the mouth of the person 34 is moving, indicating that the person 34 is speaking. As a result, the identifier may determine that the person 34 is a sound source and the position/orientation of the sound source is at (or adjacent to) the person's mouth, as the person is speaking. Thus, the identifier may determine whether objects within the 3D scene are (e.g., associated with) producing sound the 3D scene and/or the position of the sound sources based on identified visual objects within the scene. In addition to (or in lieu of) identifying sound sources, the identifier may perform the image analysis function to identify the location of the sound sources (e.g., based on an object's location with respect to the global scene origin of the 3D scene).

As described herein, the media program may include active sound sources and/or passive sound sources. As described thus far, the identifier is configured to identify (and/or determine positions of) active sound sources. In another aspect, the identifier may be configured to identify passive sound sources. For instance, the identifier may receive an indication that the 3D scene includes a passive sound source with the media program (e.g., as metadata). In another aspect, the identifier may identify passive sound sources based on a performance of the image analysis function, as described herein. A passive sound source may be a source that is arranged to produce reflective or diffractive sound of sound within the 3D scene. Thus, the identifier may perform the image analysis of at least a portion of the video content of the media program to identify (e.g., surfaces of) objects (structures or locations) within the 3D that may be associated with a passive sound source that may be arranged to reflect or diffract sound. For example, referring to FIG. 2, the identifier may identify the passive sound source on the window of the inside cabin 32 based on a determination that the window has a flat surface that is (e.g., normally) known to produce reflected or diffracted sound (e.g., in the physical world). Once identified, the identifier may determine the position of the passive sound source, as described herein (e.g., based on its location within the 3D scene with respect to a reference point).

In one aspect, the identifier may be configured to determine one or more acoustic parameters associated with passive sound sources. In particular, since passive sound sources produce reflected or diffracted sound that is produced within the 3D scene, the media program may not include audio data associated with the passive sound sources. Instead, the identifier may be configured to determine acoustic parameters, which may be used by (e.g., an audio renderer of the) decoder side to produce one or more audio signals for the passive sound source based on one or more other spatialized sounds (e.g., of one or more active sound sources) within the 3D scene. In one aspect, the acoustic parameters may include at least one of a level of diffuseness (e.g., based on the 3D scene), a cutoff frequency, a frequency response, a geometry of the surface and/or object associated with the passive sound source, an acoustic surface parameter of the object, a reflectivity value, an absorption value, and a type of material of the object. In one aspect, at least some of these parameters may be predefined. In another aspect, at least some may be determined based an image analysis of the object associated with the passive sound source. In some aspects, at least some of the parameters may be received (e.g., as part of the media program).

The identifier 14 is configured to determine whether the 3D scene includes one or more 3D scenes (e.g., 3D sub-scenes) within the 3D scene (e.g., of which one or more sound sources are a part of (or located within)). In one aspect, the identifier may determine whether the 3D scene includes a 3D sub-scene based on behavior of sound sources within the 3D scene. For example, the identifier may determine whether a sound source within the 3D scene is moving with (or has a same trajectory) as one or more other sound sources within the 3D scene. In particular, the identifier may determine whether a position of a sound source is moving with a position of another sound source. If so, this may indicate that both sound sources are associated with each other. Referring to FIG. 2, an identification of the second sub-scene 35b may be based on both sound sources 46d and 46e (e.g., in particular that their respective positions 39d and 39e within the 3D scene 30 are) moving in a same trajectory (e.g., in a forward direction as the boat 33 is propelled forward). In another aspect, the determination may be based on audio content and video content of the media program. Returning to the previous example, the identifier may identify the second sub-scene based on identifying the boat 33 within the 3D scene 30 (e.g., based on an object recognition algorithm), and determining that the positions 39d and 39e are on the identified boat. In another aspect, the identifier may determine that sound sources are a part of the same sub-scene based on the sounds that the sources are producing. For instance, the identifier may perform an acoustic analysis of the sound source of the smoke stack 46e to determine that it is of a sound of a boat stack. The identifier may determine that this position is associated with the sub-scene 35b, since the sub-scene is of a boat, which would produce such a sound.

In one aspect, the identifier may be configured to determine whether one or more 3D sub-scenes are nested within other 3D sub-scenes within the 3D scene. For instance, the identifier may be configured to identify a 3D sub-scene that may be separate from (and/or contained within) another 3D sub-scene, based on a logical separation between the scenes. For example, referring to FIG. 2, the identifier may identify the 3D sub-scene 35c as being separate from the second sub-scene 35b (e.g., being inside the boat 33), since the third sub-scene is within a cabin that is inside of the boat 33.

As described thus far, the identifier may identify a sub-scene based on behavior of their sound sources (e.g., moving in a same trajectory). In another aspect, the identifier may determine that the 3D scene includes a 3D sub-scene based on the (e.g., new) behavior of a sound source and an identified 3D sub-scene. For example, the identifier may determine that a sound source position has a same trajectory as a (e.g., existing) 3D sub-scene, and may include the sound source as part of the 3D sub-scene. As an example, referring to FIG. 2, the identifier may identify the tour bus 31 as being (or including) the first sub-scene 35a, and then may subsequently determine that the sub-scene 35a includes the person 34 based on the person moving towards (or with) the tour bus 31.

In some aspects, the identifier 14 may be configured to determine the position (e.g., origin) of the identified 3D sub-scenes. In particular, the identifier 14 may determine the position of an identified 3D sub-scene as an origin of the 3D sub-scene with respect to another origin within the 3D scene. For example, the identifier my assign (or designate) a location within the 3D scene as an origin of the sub-scene. In one aspect, the origin may be defined based on the locations of one or more sound sources within the sub-scene. For example, the origin of a sub-scene may be centered (e.g., within a 3D space of the sub-scene) with respect to the positions of one or more sound sources of the sub-scene. In one aspect, origins of 3D sub-scenes may be positioned with respect to a reference point (e.g., a global scene origin) of the (e.g., global) 3D scene. If, however, a first 3D sub-scene is within a second 3D sub-scene, the origin of the first 3D sub-scene may be defined with respect to the origin of the second 3D sub-scene, as shown in FIG. 2 as origin 38c is with respect to origin 38b. More about defining the positions of the 3D sub-scenes origins is described herein.

In one aspect, the identifier may identify the positions of the origins of the one or more 3D sub-scenes to produce a scene tree structure (e.g., structure 36 in FIG. 2) and from this structure, the identifier may determine the positions of the sub-scene sound sources, such that the positions of the sound sources are with respect to their respective sub-scene. In another aspect, the positions of the sound sources may be a part of the scene tree structure. In another aspect, the positions of the sound sources may be separate from the scene tree structure (e.g., each sound source being associated with or having a separate payload that includes positional data of a respective source). More about determining positions is described herein.

As described thus far, the identification of sound sources and/or sub-scenes, and their positions (origins) may be based on an analysis of the audio content and/or video content of the media program. In another aspect, the identification may be based on user-input. For instance, the encoder side 11 may receive user input (e.g., via an input device, such as a touch sensitive display), that identifies sources and/or sub-scenes, and their locations within the 3D scene of the program.

The identifier 14 may be configured to produce positional data that includes 1) positions (e.g., origins) and/or orientations of sound sources (e.g., with respect to origins of 3D scenes of a media program), 2) positions (e.g., origins) and/or orientations of one or more 3D scenes (e.g., 3D sub-scenes and the 3D global scene), and/or 3) other data, such as indications of which sound sources/3D sub-scenes are associated with the positions, the one or more acoustic parameters, etc.), as position(s) 19. The identifier 14 may be configured to provide the position(s) 19 to the encoder 15. In particular, the positions 19 may include the origins as a scene tree structure produced by the identifier that identifies the position (and/or characteristics) of origins of 3D sub-scenes with respect to one another. The position(s) 19 may also include (e.g., individual) position payloads or positional data for position payloads for each sound source, where each position payload references at least one origin from the scene tree structure.

In one aspect, the encoder 15 may be configured to receive audio content 18 (e.g., as one or more audio signals) and the data (e.g., the position(s) 19) produced by the identifier 14, and may (optionally) receive the video content 17 (e.g., as one or more video signals), and may be configured to produce a bitstream 20 that has the audio (and/or video) content and includes (e.g., scene) metadata 21 based on the position(s) 19. For instance, the encoder 15 may be configured to (e.g., use the position(s) of the one or more origins of the 3D scene(s) to) encode the scene tree structure as the scene metadata and/or the encoder 15 may be configured to encode positions of the sound sources within the 3D scene(s) with respect to the encoded scene tree structure as the metadata 21. For example, referring to FIG. 2, the encoder may encode 1) the global scene origin 37, 2) the origins (e.g., 38a and 38b) of 3D sub-scenes (e.g., 35a and 35b) that are with respect to the global origin, and 3) other origins of other 3D sub-scenes with respect to origins of other sub-scenes (such as origin 38c of sub-scene 35c), as the encoded scene tree structure. The encoder may also encode positions of sound sources (e.g., 39a-39f and 40) with respect to origins of the encoded origins of the 3D scene and/or 3D sub-scenes. More about encoding the scene tree structure that defines relationships between audio components of the 3D scene of the media program is described herein.

In one aspect, the encoder 15 may encode the audio content associated with the media program (e.g., when the media program is an audio program) according to any audio codec, such as Advanced Audio Coding (AAC). In another aspect, when the media program is an A/V program, the encoder may encode the audio and video content according to an A/V codec, according to the Moving Picture Experts Group (MPEG) standard. The encoder 15 may be configured to transmit the bitstream 20 (with the encoded metadata 21), via the network 43, to the decoder side 12. In particular, the electronic device executing the encoder operations may transmit the bitstream to another electronic device that is to execute (or is executing) decoder operations (and spatially rendering operations to playback spatial audio). In one aspect, the encoder side 11 may store (at least a portion) of the bitstream 20 in (e.g., local, or remote) memory (e.g., for later transmission).

The decoder side 12 will now be described. The decoder side 12 includes several operational components, such as a decoder 22, an audio renderer 23, a listener position estimator 25, a (optional) display 24, and two speakers 26a and 26b. In one aspect, the decoder side may include more or fewer components, such as having more displays and/or speakers, or not having a display (e.g., which is a part of the decoder-side device that is performing the decoder side operations).

The decoder side 12 receives the bitstream 20 that was produced and transmitted by the encoder side 11. In particular, the decoder 22 may be configured to receive the bitstream 20, which includes an encoded version of audio content 18 (e.g., as one or more audio signals) and/or an encoded version of video content 17 (e.g., as one or more video signals) associated with the media program 16, and the (encoded) metadata 21 that includes the 1) encoded scene tree structure that describes the positional relationships between origins of one or more 3D scenes of the media program and 2) positions of one or more sound sources of the media program. For instance, when the media program is an audio program, the bitstream 20 received by the decoder side 12 may include an encoded version of one or more audio signals that are associated with one or more sound sources that are within a 3D scene of the audio program, and receive the scene tree structure (e.g., that represents an initial configuration of the 3D scene, as described herein). The decoder may be configured to decode the encoded content and the metadata 21 (e.g., according to the audio codec used by the encoder to encode the bitstream 20).

In some aspects, the display 24 is designed to present (or display) digital images or videos of one or more video signals (or video (or image) content). In one aspect, the display 24 is configured to receive the decoded video content 17 from the decoder 22 for display.

The listener position estimator 25 may be configured to estimate (determine) the position of a listener (e.g., within the 3D scene of the media program) and provide the position to the audio renderer 23 for use in spatially rendering the media program. For instance, in the case in which the 3D scene of the media program includes an XR environment in which (e.g., an avatar of) the listener is participating, the estimator 25 may determine the listener's position within the XR environment. Such a determination may be based on user input through one or more input devices (not shown) that a listener may use to navigate the XR environment. In another aspect, the listener position may be at (or near) the position of the global scene origin within the 3D scene. In another aspect, the position of the listener may be predefined within the 3D scene.

In another aspect, the estimator 25 may be configured to determine changes in the listener's position and/or orientation within the 3D scene. For example, the estimator 25 may receive head tracking data from a head tracking device that may be coupled to the listener (e.g., a tracking device on a headset being worn by the listener), and from the head-tracking data estimate the changes, which may be provided to the audio renderer that may be configured to use the changes to adjust spatial rendering of the media program, as described herein.

The audio renderer 23 may be configured to receive the audio content 18 of the media program and receive the position(s) 19 of a global scene origin of the 3D scene of the media program, positions of origins of one or more sub-scenes within the 3D scene, and/or positions the (active and/or passive) sound sources within the 3D scene, as indicated by the scene metadata 21 within the bitstream 20. Using the positions, the audio renderer may determine the positions of the sound sources within the global 3D scene with respect to the position of the listener. For example, referring to FIG. 2, the audio renderer may determine the listener position with respect to the global scene origin 37 (or may be received from the estimator 25), and may determine positions of sound sources (e.g., sound source position 39a) with respect to the global scene origin (e.g., based on the position of the sub-scene origin 38a with respect to the global scene origin 37), and based on these determinations, determine the relationship between the sound sources of the 3D scene and the listener position within the 3D scene.

The audio renderer is configured to spatially render (e.g., one or more sound sources within) the 3D scene using the audio content 18 and the received positional data from the decoder and/or the estimator 25. In particular, the renderer is configured to produce a set of one or more spatially rendered audio signals by spatially rendering audio signals associated with one or more sound sources according to the sound source positions with respect to the listener's position. In particular, continuing with the previous example, the audio renderer 23 may use the relationships between the sound sources and the listener position (based on the scene tree structure), to determine one or more spatial filters. For instance, the spatial filters may include a head-related transfer function (HRTF), which may be selected by the renderer 23 based on the positions (and/or orientations) of the sources with respect to the listener position (and/or orientation). In one aspect, the audio renderer may produce spatially rendered audio signals by applying one or more determined spatial filters to one or more audio signals of the media program. In one aspect, when the spatial filters are HRTFs, the spatially rendered audio signals may be a set of binaural audio signals. The audio renderer is configured to use the produced spatially rendered audio signals, the renderer 23 may drive one or more speakers (e.g., speakers 26a and 26b) in order for the speakers to produce the sound of the sound sources at their determined locations in an acoustic space, as perceived by the listener. For instance, the audio renderer may use binaural audio signals to drive one or more speakers of a headset that is being worn by the user (e.g., where a left binaural signal drives a left speaker of the headset, and a right binaural signal drives a right speaker of the headset).

FIGS. 5-7 and 12 are flowcharts of processes 50, 60, 70, and 80, respectively, for performing one or more digital (e.g., audio) signal processing operations and/or network operations for encoding and decoding a bitstream with metadata. In one aspect, at least some of the operations may be performed by the encoder side 11 and/or decoder side 12 of the system 10. For instance, at least some of the operations of processes 50, 60, and/or 80 may be performed by the encoder side (e.g., any electronic device performing encoder-side operations, such as the media content device 42 of system 41); and at least some of the operations of processes 60 and/or 80 may be performed by the decoder side (e.g., any electronic device performing decoder-side operations, such as the playback device 44 and/or the output device 45 of system 41).

Figure 5:
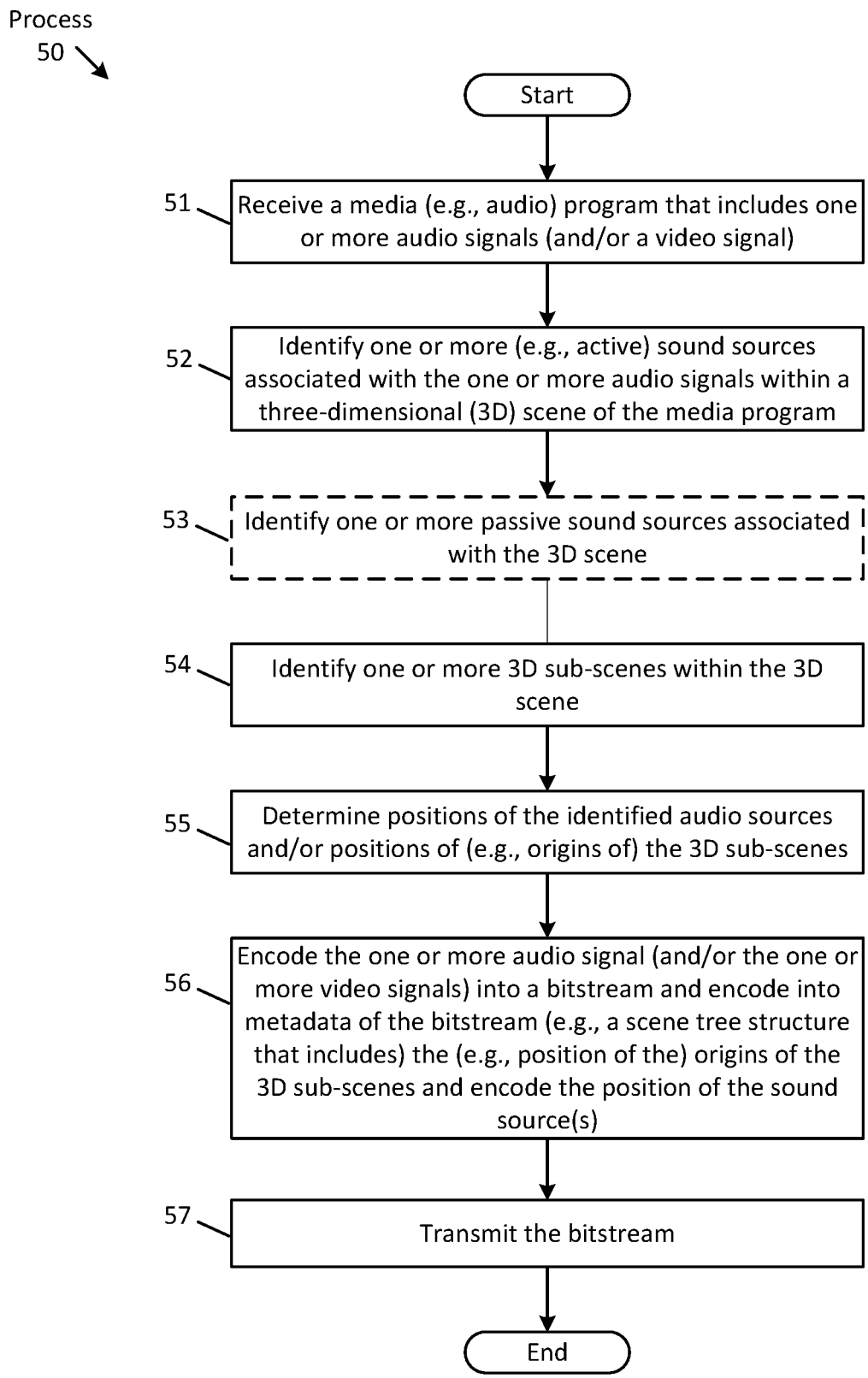
FIG. 5 is a flowchart of one aspect of a process at an encoder side for encoding scene metadata and audio content into a bitstream for transmission to a decoder side.

Turning to FIG. 5, this figure is a flowchart of one aspect of the process 50 performed at the encoder side 11 for encoding scene metadata and audio content into a bitstream for transmission to a decoder side. The process 50 begins by the encoder side 11 receiving a media (e.g., audio) program that includes one or more audio signals and/or one or more video signals (at block 51). The encoder side identifies one or more sound sources associated with the one or more audio signals within a 3D scene of the media program (at block 52). As described herein, the identifier 14 may identify one or more sound sources by performing an acoustic analysis (e.g., BSS) upon the one or more audio signals. In the case in which the media program includes one or more video signals, the identifier 14 may identify sound sources based on an image analysis (e.g., performing an object recognition function) to identify one or more objects associated with sound sources. The encoder side (optionally) identifies one or more passive sound sources associated with the 3D scene (at block 53). For instance, the identifier may determine whether the media program indicates that the 3D scene includes passive sound sources (e.g., based on whether the program included acoustic parameters). In another aspect, the identifier 14 may identify a structure or location within video content of the media program that is associated with a passive sound source (e.g., a flat surface). In one aspect, upon identifying passive sound sources, the encoder side may be configured to determine one or more acoustic parameters associated with the identified passive sources, as described herein.

The encoder side 11 identifies one or more 3D sub-scenes within the 3D scene (at block 54). In particular, the identifier 14 may identify a 3D sub-scene based on sound sources within the 3D scene. For example, the identifier 14 may identify a portion of the 3D scene is a 3D sub-scene based on whether (positions of) sound sources move in a same trajectory (e.g., and are within a threshold distance of each other within the 3D scene). As another example, the identifier may identify a sub-scene based on whether sound sources are within a vicinity (e.g., threshold distance) between one another. As another example, the identifier may identify a sub-scene based on whether sound sources are associated with similar types of audio content. In another aspect, the identification of a sub-scene may be based on an image analysis of video content associated with the 3D scene, as described herein. For example, the identifier 14 may determine whether there are any structures (objects) or locations within the video content that are to be associated with a 3D sub-scene.

The encoder side 11 determines positions of the identified sound sources and/or positions of (e.g., origins of) the identified 3D sub-scenes (at block 55). In particular, the encoder side determines positions of origins of one or more identified 3D sub-scenes, and determines positions of one or more identified sound sources with respect to one or more origins of the identified 3D sub-scenes (e.g., sound sources associated with a particular sub-scene being with respect to that sub-scene's origin, as described herein). In one aspect, the encoder side 11 may also identify other positional information, such as rotational data that indicates the orientation of the origins. For instance, the identifier may determine positions of sound sources, as described herein. For example, the media program may include positional data associated with one or more sound sources. In another aspect, the identifier 14 may perform a sound localization function to identify the position of the sound source within the 3D scene. In some aspects, the identifier 14 may determine a position of (e.g., an origin) of a 3D sub-scene to correspond to a position of a structure or location within a 3D scene of video content of the media program. In another aspect, the identifier may determine a position of a 3D sub-scene based on positions and/or characteristics of sound sources, as described herein (e.g., whether sound source positions are ground within a vicinity of each other).

In one aspect, the encoder side 11 may determine relationships between origins of 3D sub-scenes (e.g., to determine the scene tree structure). For example, the encoder side may form relationships between 3D sub-scenes and the 3D global scene, where the 3D sub-scene positions are within a threshold distance of from the global scene. In another aspect, the encoder side may determine the position of a sub-scene with respect to an origin of another sub-scene based on various conditions. For instance, a sub-scene origin may be with respect to another sub-scene origin that is of a sub-scene in which the original sub-scene is located within. In another aspect, sub-scene origins may be with respect to a sub-scene origin, where the origins are located within (or about) a structure or location within a 3D scene.

In one aspect, from this information, the encoder side may determine whether any sound sources are to be associated with one particular 3D sub-scene (e.g., based on sound sources having a same trajectory and/or being within a same vicinity of one another). In one aspect, the identifier may determine a position of a sound source with respect to an origin of a 3D sub-scene to which the sound source is associated with the sub-scene, for example, referring to FIG. 2, the encoder side may determine the sound source position 39e of the smoke stack with respect to sub-scene origin 38b, since the origin is of the boat 33 to which the smoke stack is a part of. In another aspect, the encoder side may determine the position of the sound source with respect to an origin that is positioned in a vicinity of the sound source (e.g., within a threshold distance of the sound sources within the 3D scene).

The (e.g., encoder 15 of the) encoder side 11 encodes the one or more audio signals (and/or one or more video signals) into a bitstream and encodes into metadata of the bit stream (e.g., a scene tree structure) that includes the positions of the one or more origins of the identified 3D sub-scenes and that includes (e.g., positional data and other associated data of) one or more sound sources of the media program (at block 56). In particular, the encoder encodes into metadata of the bitstream 1) a scene tree structure that includes at least one origin (e.g., of a 3D sub-scene) relative to another origin of another 3D scene (e.g., which may be another 3D sub-scene or the 3D global scene) of the audio program, and 2) a position of a sound source (of the audio program), relative to the at least one origin, the position of the sound source referencing the at least one origin using an identifier. In one aspect, the encoded metadata by the encoder side may define an initial configuration of the sound source with respect to one or more 3D scenes of the audio program to be rendered by the decoder side. More about encoding positions and rendering sound sources is described herein. The encoder side 11 transmits the bitstream, which includes the encoded metadata, to a decoder-side device (at block 57).

In one aspect, at least some operations described in process 50 may be performed linearly. In another aspect, at least some operations may be performed contemporaneously with other operations. For instance, the encoder side 11 may identify a sound source and determine its position within the 3D scene (e.g., at or relatively at the same time). As described herein, at least some of the operations may be performed by the identifier 14 to identify positions (and/or origins) and determine their positions within the 3D scene). In another aspect, at least some of these operations may be performed by the encoder 15, while the encoder is encoding this data into the bitstream (as the scene tree structure). In another aspect, the operations to transmit the bitstream may be optional, and may instead store the audio content, determined positions, and/or the encoded bitstream in memory for later transmission.

Figure 6:
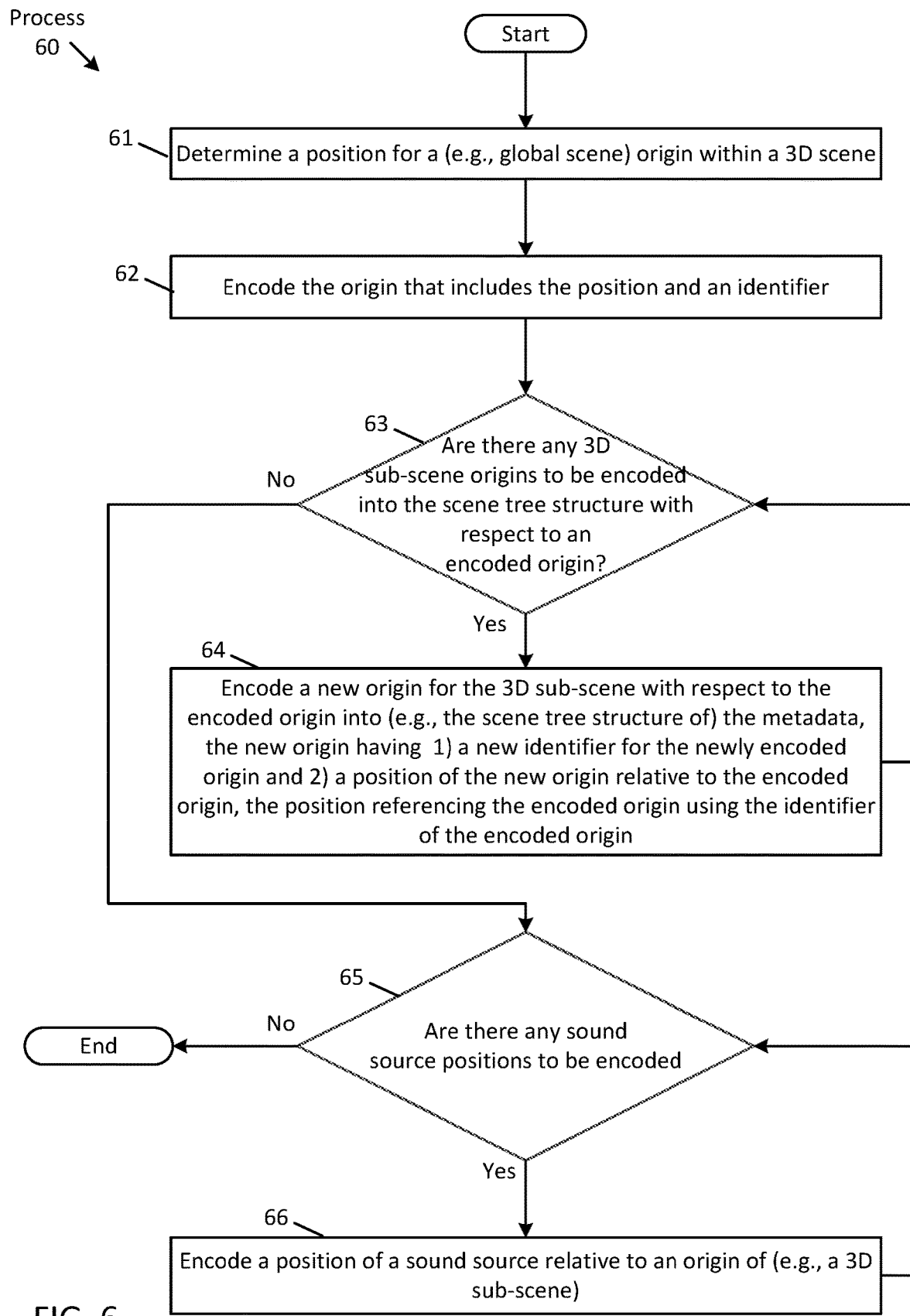
FIG. 6 is a flowchart of one aspect of a process at an encoder side for encoding a scene tree structure as metadata into a bitstream.

FIG. 6 is a flowchart of one aspect of the process 60 performed (e.g., by the encoder 15) at the encoder side 11 of the audio codec system 10 for encoding a scene tree structure (e.g., determined by the encoder side) that defines the relationships between audio components within a 3D scene as metadata into a bitstream. Specifically, the encoder 15 encodes the scene tree structure (e.g., positions of scene origins and/or sound sources received by the identifier as the position data 19) into the bitstream. In particular, this process 60 may be (e.g., at least partially) performed by the encoder 15 at block 56 in process 50 of FIG. 5) to encode the positions determined by the identifier 14 into the metadata 21 of the bitstream 20. The process 60 begins by the encoder side 11 determining a position for a (e.g., global) scene origin within a 3D scene of the received media program (at block 61). In one aspect, a 3D scene that includes one or more sound sources and/or 3D sub-scenes may include one origin, as the global scene origin from which positions of sound sources and origins of sub-scenes originate from. In some aspects, the position may be at an origin of a coordinate system, such as x=0, y=0, and z=0 of a Cartesian coordinate system.

The encoder side 11 encodes the (global scene) origin of the 3D scene that includes the position of the origin (e.g., within a coordinate system) and an identifier that identifies the origin (at block 62). In one aspect, the position may include positional data that describes the origin's position, such as having Cartesian coordinates of an origin of the coordinate system. In one aspect, the identifier may be a unique identifier for the origin.

The encoder side 11 determines whether there are any 3D sub-scene origins to be encoded into the scene tree structure with respect to the encoded origin (at decision block 63). In particular, the encoder 15 may determine whether any 3D sub-scene origins have been defined within the 3D scene with respect to the global scene origin (e.g., based on the positions 19 received from the identifier 14). For example, referring to FIG. 2, the encoder may identify the sub-scene origin 38a of the sub-scene 35a to be encoded, since its position within the 3D scene is linked (with respect) to the global scene origin 37. If so, the encoder encodes a new origin for the (identified) 3D sub-scene with respect to the (e.g., previously) encoded origin into (e.g., the scene tree structure of) the metadata, the new origin having 1) a new (e.g., unique) identifier for the newly encoded origin and 2) a position of the new origin relative to the encoded origin, the position of the newly encoded origin referencing the (previously) encoded origin using the identifier of the (previously) encoded origin (at block 64). In particular, the position of the newly encoded origin may include 1) a position of the (previously) encoded origin (from which the newly encoded origin is linked), referenced by its identifier (e.g., having only the identifier of the previously encoded origin) and 2) positional data that describes the position of the newly encoded 3D sub-scene's origin with respect to the previously encoded origin within the 3D scene. For example, the positional data may include the location of the 3D sub-scene's origin as coordinates within a coordinate system of the 3D scene. As an example, the positional data may include a set of Cartesian coordinates (e.g., x, y, and z coordinates) that indicate the position of the origin within the Cartesian coordinate system with respect to the origin of the 3D scene. As another example, the positional data may include a set of Spherical coordinates (e.g., an azimuth value, an elevation value, and a radius) that indicate the position of the origin within a Spherical coordinate system with respect to the origin of the 3D scene. In one aspect, the positional data may include additional data, such as rotational data (rotational parameters) of the origin that is being encoded with respect to the previously encoded origin. The positional data may include a maximum distance parameter that describes the maximum distance that can be encoded (e.g., with respect to an origin). In one aspect, at least some of the positional data may be encoded with respect to the maximum distance parameter, such as the encoded coordinate data (e.g., Cartesian coordinates). In another aspect, the positional data may include other data, as described herein. More about how the encoder side 11 encodes the metadata is described herein.

The process 60 returns to decision block 63 to determine whether there are any (e.g., additional) 3D sub-scene origins that are to be encoded within the scene tree structure with respect to any of the previously encoded origins. Thus, the encoder may build the scene tree structure that includes at least some of the origins of 3D sub-scenes that were identified by the encoder side 11, which may be linked to the global scene origin and/or to other 3D sub-scene origins. As a result, each sub-scene origin (and the global scene origin) may be assigned a unique identifier, which may be used by one or more origins as a reference origin.

If, however, all (or at least some) of the origins of the 3D sub-scenes have been encoded, the process 60 proceeds to determine whether there are any sound source positions that relate to an encoded origin is to be encoded (at decision block 65). If so, the encoder side 11 encodes a position of a sound source relative to an origin (e.g., of a 3D sub-scene) into (e.g., a position payload) into the metadata (at block 66). In one aspect, the encoded position may include similar data as the position of the encoded origins, such as having 1) an identifier of an origin to which the position of the sound source is referenced and 2) positional data of the sound source (e.g., a set of Cartesian coordinates). In one aspect, the positional data may also include orientation information about the sound source. For instance, the identifier 14 may determine an orientation of the sound source with respect to an origin of the 3D scene, and may include the orientation (e.g., in 3D space) as part of the position(s) 19 provided to the encoder. As a result, the encoder may include rotational parameters within the positional data that indicate an orientation of the sound source (e.g., with respect to its origin). In another aspect, the positional data may include characteristics of its associated sound source. For instance, when the sound source is a passive sound source, the positional data may include one or more acoustic parameters associated with the passive sound source, as described herein.

The encoder side 11 returns to the decision block 65 to determine whether additional sound source positions are to be encoded. If so, the process 60 returns back to block 66.

In one aspect, the positional data may be normalized to a (e.g., predefined) scaling factor that indicates a maximum distance parameter (e.g., within any direction in the 3D scene) that can be encoded. In particular, when the positional data includes the location of a sound source in Cartesian coordinates, each of the coordinates may be normalized with respect to the maximum distance parameter, where the maximum distance may be included within the positional data for use by the decoder side 12 for decoding the positional data. In one aspect, the encoder may encode a square root value of the maximum distance parameter into the bitstream. More about the normalization of the positional data and the maximum distance is described herein.

In one aspect, if all sound source positions have been encoded, the process 60 may end. In another aspect, the encoder side 11 may perform the process 60 for each identified 3D sub-scene origin. In which case, upon encoding a new origin, the encoder side may proceed to decision blocks 65 and 66 to encode sound source positions of that sub-scene. Upon completion of encoding all of the sound source positions, the encoder side 11 may proceed back to decision block 63 to encode a new origin and/or sound source positions of another 3D sub-scene. The encoder side 11 may continue to perform these operations until all positions have been encoded, as described herein.

Figure 7:
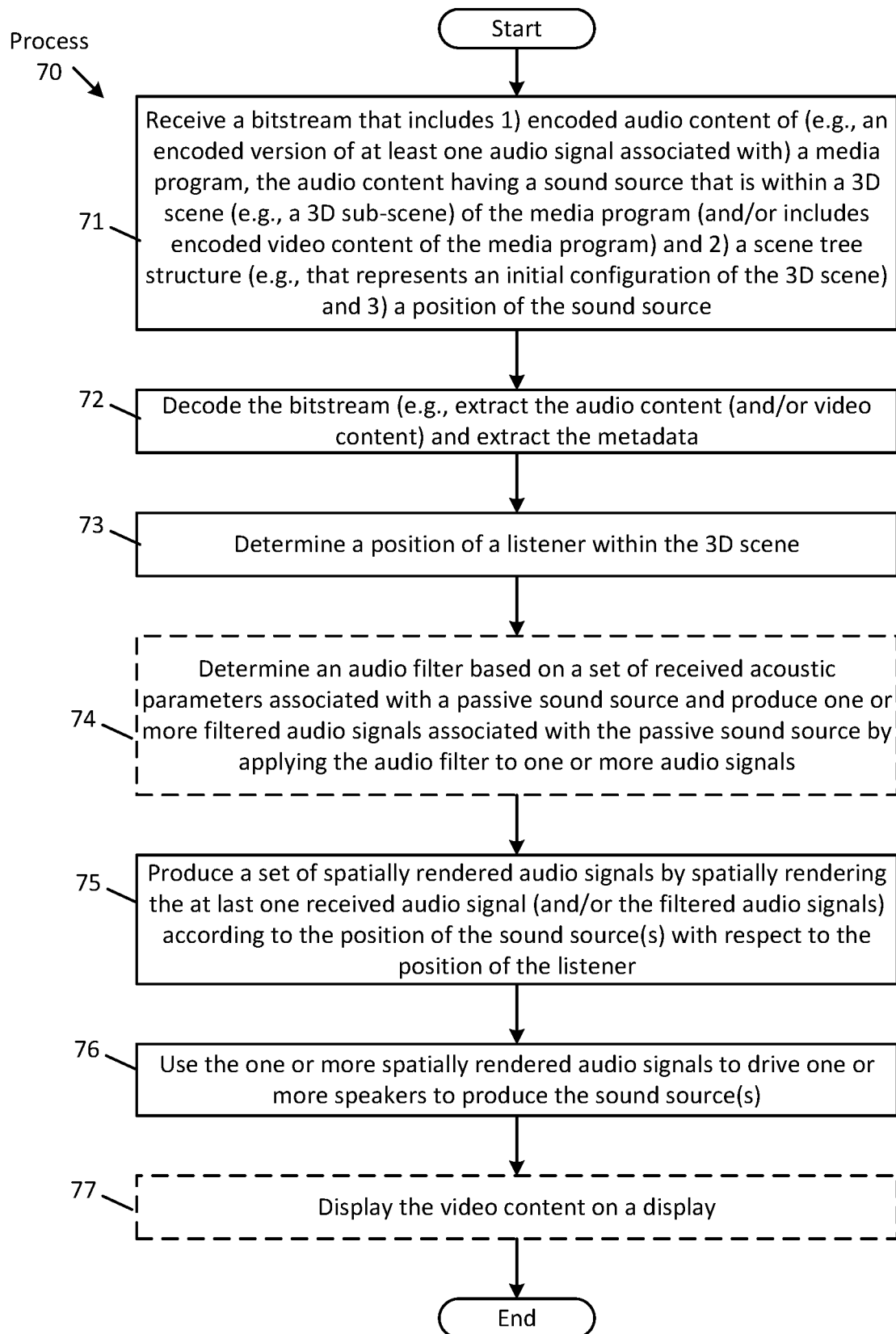
FIG. 7 is a flowchart of one aspect of a process at a decoder side for receiving a bitstream and using scene metadata encoded therein to spatially render audio content of the bitstream.

FIG. 7 is a flowchart of one aspect of the process 70 at the decoder side 12 for receiving a bitstream (e.g., bitstream 20) and using scene metadata (e.g., metadata 21) encoded therein to spatially render audio content of the bitstream. The decoder side 12 receives (or obtains) the bitstream that includes 1) encoded audio content (e.g., an encoded version of at least one audio signal associated with) a media (e.g., audio) program, the audio content having a (or at least one) sound source that is within a 3D scene (e.g., a 3D sub-scene) of the media program (and/or includes encoded video content of the media program), 2) an encoded scene tree structure (e.g., that represents an initial configuration of the 3D scene of the media program), and 3) a position of the sound source (at block 71). In particular, the encoded tree structure may include an origin of a 3D scene (e.g., a 3D global scene) and positions of one or more other origins (e.g., of 3D sub-scenes) that relate either to the origin of the 3D global scene or to an origin of another 3D scene. As an example, the tree structure may include an origin of a first 3D scene (e.g., a 3D sub-scene) relative to an origin of a second 3D scene (e.g., the 3D global scene). As described herein, the position of the sound source may be with respect to at least one origin within the tree structure. Continuing with the previous example, the position of the sound source may be within the 3D sub-scene (e.g., smoke stack sound 46e on the boat 33) relative to the origin of the 3D sub-scene (e.g., position 39e relative to origin 38b). As described herein, the position of the sound source may reference the origin of the 3D sub-scene using an (e.g., unique) identifier associated (e.g., by the encoder side) with the 3D sub-scene. In one aspect, the decoder side may receive multiple sound sources, where each is associated with different positional data that indicates the position of a respective sound source within a 3D scene (e.g., relative to the 3D scene's origin). In one aspect, the bitstream may be received in response to user input to playback the media program (e.g., on the decoder-side device). In another aspect, the bitstream that is obtained may include an initial (or beginning) portion of the media program that is being streamed to the decoder side, where the metadata included within the bitstream defines the initial configuration of one or more origins (e.g., of one or more 3D sub-scenes) within the 3D scene, to which the sound sources relate. As described herein, the decoder side may obtain additional metadata, subsequent to receiving the metadata associated with the initial configuration for updating playback at the decoder side. More about updating is described herein.

The (e.g., decoder 22) decodes the bitstream (at block 72). In particular, the decoder 22 may extract the encoded audio content (and/or video content) from within the bitstream, and extract the encoded scene tree structure. For example, the decoder may extract the positions of one or more origins (e.g., the origin of the 3D scene and/or one or more origins of 3D sub-scenes), and may extract positions of the sound sources (e.g., with respect to the origins). In one aspect, the extracted positional data from the metadata may include the positions of sound sources and/or origins as coordinates within a coordinate system (e.g., Cartesian coordinates), the maximum distance parameter associated with the coordinates, rotational parameters that indicate an orientation of the sound sources (and/or 3D sub-scenes), and/or acoustic parameters (e.g., associated with passive sound sources). From the positional data, the decoder may be configured to reproduce the scene tree structure for the 3D scene from prior to the encoding. For example, as described herein, coordinates of the encoded scene tree structure may be normalized with respect to the maximum distance parameter. As a result, to determine a position, the audio renderer use the maximum distance to scale the position with respect to its origin from prior to the encoder side's encoding of the position. As a result, the decoder may reproduce the position(s) 19 of the sound sources (with respect to one or more origins of the 3D scene) and provide the position(s) 19 to the audio renderer 23. More about extracting the metadata from the bitstream is described herein.

The (e.g., listener position estimator 25) determines a position of a listener within the 3D scene (at block 73). For instance, the estimator may determine that the listener is within (or has an acoustic perspective from within) a 3D sub-scene of the media program within the (e.g., global) 3D scene of the program. In which case, the decoder side may determine how to spatially render the media program based on the listener's position within the 3D scene with respect to the sound sources within the 3D scene. For example, the audio renderer 23 may use a (e.g., previously defined) position model, which outputs one or more spatial filters (with which the audio renderer uses to spatially render audio data) in response to positional data of sound sources (and/or positional data of origins of one or more 3D scenes) and the position of the listener within a 3D scene as input. In another aspect, for audio renderer 23, the positions of sound sources relative to their respective origins are transformed such that the positions relate to the listener's position. For example, referring to FIG. 2, the listener position may be on the tour bus 31 and has a position (and orientation) relating to the sub-scene origin 38a. The position of the sub-scene origin 38b of the boat must be transformed such that it also relates to the listener's sub-scene origin 38a. For instance, the audio renderer may translate and rotate the sub-scene origin 38b to map the position of the boat relative to the global scene origin 37. The position of the (e.g., sub-scene origin 38b of the) boat may then be mapped to the listener's position (and orientation) by applying an inverse translation and rotation of the sub-scene origin 38a and the inverse translation and rotation of the listener position on the tour bus. Thus, by relating the listener position to the boat, the audio renderer may accurately render sound sources of the boat with respect to the listener position.

In another aspect, the audio renderer may determine that only a portion of the received sound sources are to be spatially rendered based on the listener's position. For example, referring to FIG. 2, upon determining that the listener's position is within the cabin 32, the decoder side may determine that only sound sources within the cabin (e.g., the sound source at position 39f and the sound source at position 40) are to be spatially rendered, the others may not, since the user may not be within hearing distance (e.g., within a physically audible range) of those sound sources, such as the sound sources associated with the tour bus.

The decoder side 12 determines an audio filter based on a set of received acoustic parameters associated with a passive sound source of the 3D scene and produces one or more filtered audio signals associated with the passive sound source by applying the audio filter to the one or more audio signals (at block 74). As described herein, a passive sound source reproduces reflected or diffracted sound produced by one or more sound sources within the 3D scene, which is due to acoustic parameters associated with the sound source. In which case, the audio filter produced by the decoder side 12 that is applied to the audio signals accounts for the result of the reflection or diffraction upon the sound of the audio signals. In one aspect, the filter may be any type of filter, such as a low-pass filter, a high-pass filter, an all-pass filter, and/or a band-pass filter.

The decoder side produces a set of spatially rendered audio signals (e.g., binaural audio signals) by spatially rendering the at least one received audio signal (and/or the filtered audio signals) according to the position of the sound source(s) with respect to the position of the listener (at block 75). For example, the audio renderer may be configured to determine one or more spatial filters (e.g., HRTFs) based on the extracted scene tree structure (and positions of one or more sound sources within a 3D scene) with respect to the determined position of the listener, as described herein. The decoder side uses the one or more spatially rendered audio signals to drive one or more speakers to produce the sound source(s) of the 3D scene (at block 76). For example, in the case in which the listener is wearing headphones (as an output device), the audio renderer may drive the left and right speakers of the headphones with one or more spatially rendered signals. Thus, the decoder side is configured to spatially render the 3D scene of the obtained media program to produce one or more sound sources with respect to the position of the listener. For example, in the case of the 3D scene having two sound sources, the bitstream may include (e.g., encoded) audio content for both sources and respective position data, with which the decoder side spatially renders the sources with respect to the listener position. The decoder side (optionally) displays the video content (e.g., of which the 3D scene audibly represents) on a display (at block 77). In particular, the media program may be an A/V program of a motion picture, where the audio content is the movie sound track of the video content of the motion picture. In one aspect, this operation is optional, since the decoder side may not receive video content when the media program is an audio program, such as a musical composition.

As described herein, the encoded audio content (e.g., of an A/V program) received within the bitstream may audibly represent video content that is displayed on a display. In one aspect, the video content may be an XR environment, in which a listener is participating, which is audibly represented by the sound of the encoded audio data. In which case, structures or locations within the XR environment may correspond to one or more spatially rendered sound sources, and the position of the listener may be within the environment, as well. In one aspect, at least one sound source spatially rendered by the audio renderer 23 of the decoder side 12 may be an active sound source associated with an object or location within the video content displayed on the display. In another aspect, at least one sound source may be a passive sound source, which corresponds to a structure or object that is displayed (e.g., within a visual environment) on the display of the decoder side. In which case, the bitstream may include a position of a passive sound source relative to an origin, where the passive sound source is arranged to produce a reflected or diffracted sound from one or more active sound sources off a surface within the XR environment. Thus, when the audio content is spatially rendered, a listener may hear sound of an active sound source from one position within the XR environment and may hear reflected or diffracted sound of the active sound source from another position (e.g., the position of the passive sound source) within the environment.

In one aspect, the audio renderer 23 may adjust the spatial rendering based on changes to the listener's position and/or orientation (e.g., based on head-tracking data). For instance, the audio renderer may determine that the listener has moved (e.g., within an XR environment). The audio renderer may determine how the listener moved from the original position. For instance, the audio renderer may determine a translation and a rotation of the listener based on the listener's movement. The audio renderer may determine a new position of the sound source (with respect to the listener's new position) based on an inverse translation of the translation and an inverse rotation of the rotation with respect to the position of the listener. In which case, the audio renderer the spatial rendering may be adjusted as if the rendered 3D scene, as if the sound source were moving while the listeners position remained static (e.g., within the 3D acoustic space). Thus, the audio renderer adjusts the spatial rendering of the 3D scene based on the new position of the sound source with respect to the position of the listener.

Another aspect of the disclosure herein is a way to add the scene tree structure into a bitstream in compliance with a future Moving Picture Experts Group (MPEG) standard (e.g., MPEG-D DRC standard), with the, which is extended herein to support scene position payloads that include a scene tree structure to be added at the decoder side for transmission to the decoder side for providing positions of 3D scenes (which may include 3D sub-scenes) and sound sources within the 3D scenes for spatial rendering media content at the decoder side. Therefore, the present disclosure provides an enhancement to the existing MPEG-D DRC standard (e.g., ISO/IEC, "Information Technology—MPEG Audio Technologies—Part 4: Dynamic Range Control," ISO/IEC 23003-4:2020) to allow an audio codec system for efficiently coding positions within a 3D scene within encoded bitstreams described herein as scene metadata.

FIGS. 8-10c and 13 show tables of enhancements to the bitstream syntax of MPEG-D DRC according to some aspects. Specifically, these figures are showing tables that include syntax of a scene tree structure payload and a position payload, where the encoder side creates and encodes metadata of positions of audio components within a 3D scene according to the position payload and encodes positions of one or more origins to which the audio components are link as an encoded scene tree structure payload according to the enhanced syntax, while the decoder side extracts the (e.g., scene tree structure and positions of audio components from) metadata from the enhanced MPEG-D DRC bitstream according to the enhanced syntax for spatial rendering of the 3D scene. Thus, the encoder side 11 may perform at least some of the operations described herein to encode the bitstream according to the syntax, and the decoder side 12 may perform at least some of the operations described herein to decode the bitstream according to the syntax.

Turning to FIG. 8, this figure shows a Table 1 that includes syntax of a ScenePositions( ) payload that includes a scene tree structure encoded by the encoder side 11 (e.g., for an initial configuration of a 3D scene). This payload may be part of a global configuration that includes an encoded tree structure of scene origins (e.g., 3D sub-scene origins) with a root of the origins at a global 3D scene origin. A description of the syntax is as follows. In one aspect, this payload may be generated, as described in at least a portion of process 60 of FIG. 6, and the decoder side 12 may decode (or extract) data from the payloads, as described in FIG. 7.

In one aspect, the ScenePositions( ) payload may indicate an initial configuration of origins within the 3D scene. In one aspect, the initial configuration may be indicated by flag forConfig, when the flag is true (or equal to one). As described herein, this initial configuration may be provided by the encoder side at the beginning (e.g., once streaming between the encoder side and decoder side is initiated for providing the media program) for playback by the media program at the decoder side.

For each of a number of scene origins encoded within the ScenePositions( ), indicated by numSceneOrigins, starting at a first origin (e.g., i=0), the decoder may extract each of the 3D scene origins during the initial configuration, SceneOrigin(i+1,forConfig=1). In one aspect, the number of scene origins may be stored as a six-bit data structure (or integer). In one aspect, each SceneOrigin may be associated with an origin of at least one 3D sub-scene and/or the global 3D scene associated with the encoded scene tree structure. As shown, each of the scene origins encoded within the metadata includes a unique identifier for the origin, sceneOriginId=Id and includes a position payload, Position (forConfig) that includes positional data of the scene origin for the initial configuration. In one aspect, an identifier=0, may be reserved for the global scene origin (e.g., origin 37 of FIG. 2) of the 3D scene. In one aspect, the positional payload of at least some origins may indicate positional characteristics of the origin with respect to a reference origin of the 3D scene. The references between the origins may represent the encoded scene tree structure. More about the Position( ) payload is described herein.

Thus, the decoder may iteratively extract positions of origins within the 3D scene until each of the origin positions have been extracted (e.g., when i=numSceneOrigins).

In one aspect, the syntax may include a flag (e.g., as one bit) that may be defined by the encoder, which when determined by a decoder to have a first value in the bitstream may indicate whether the bitstream includes an encoded scene tree. If this is the case, the decoder may be configured to determine that the metadata of the bitstream includes the ScenePositions( ) payload that has an encoded tree structure of scene origins. If, however, the bitstream includes a second value for the flag, this may indicate to the decoder that the ScenePositions( ) payload has already been transmitted to the decoder side.

Turning now to FIG. 9, this figure shows a Table 2 that includes syntax of ObjectMetadata( ) payload and WallPhysics( ) payload, both of which may be added to the bitstream according to MPEG-D DRC standard. In one aspect, the encoder side 11 may encode these payloads based on the at least some of the operations as described in process 60 of FIG. 6, and the decoder side 12 may decode (or extract) data from the payloads, as described in FIG. 7. The ObjectMetadata( ) payload and the WallPhysics( ) payload may include data encoded by the encoder side 11 that may be associated with one or more sound sources within the 3D scene of the encoded media program. In particular, the ObjectMetadata( ) payload may include (e.g., positional) data of an active sound source within the 3D scene, while the WallPhysics( ) payload may include data of a passive sound source within the 3D scene, as described herein. In another aspect, at least one payload may include data of one or more sound sources of one or more 3D scenes (e.g., 3D sub-scenes within a 3D scene).

With the ObjectMetadata( ) payload, the decoder side 12 may determine whether a flag is a first value (e.g., as a one-bit integer) is present in the bitstream that indicates that the metadata of the bitstream includes the positional data of (e.g., initial configuration of) an associated sound source of the encoded tree structure, as if(scenePositionsPresent). If so, the decoder extracts the position data for the active sound source stored in the Position( ) payload, which is described herein. Else, the decoder may extract other position metadata associated with the sound source. In one aspect, the other position metadata may be legacy metadata that indicates the position of the sound source without reference to the encoded scene tree structure. The ObjectMetadata( ) payload may also include other object metadata, which may include parameters and/or characteristics of the sound sources for use by the audio renderer when spatially rendering the sources. For example, the other object metadata may include parameters for the audio renderer to apply one or more audio signal processing operations, such as having a (e.g., desired) loudness level of the sound source. As another example, the other metadata may indicate whether one or more audio filters are to be applied to one or more audio signals associated with this sound source, such as a low-pass filter, a high-pass filter, etc. As another example, the other metadata may indicate characteristics of the sound sources, such as a reverberation level. In another aspect, the other object metadata may include spatial characteristics of the sound source.

With the WallPhysics( ) payload the decoder may determine an associated (one or more) passive sound source's positional data as the Position( ) payload. In particular, when the passive sound source was encoded within the WallPhysics( ) payload, the encoder may have encoded a position of the passive sound source by combining an identifier referencing the passive sound sources scene origin (e.g., referenceSceneOriginId, as described herein), acoustic parameters, and positional data (with respect to its reference scene origin). The WallPhysics( ) payload also includes other wall metadata, such as one or more acoustic parameters associated with the passive sound source, as described herein.

Turning to FIGS. 10a-10c, these figures show Tables 3-5 that include syntax of the Position( ) payload, which as described herein, includes (e.g., positional) data that describes the position (coordinates and/or rotation) of active sound sources, passive sound sources, and/or origins within a 3D scene. As described herein, several payloads may include the Position( ) payload, such as SceneOrigin payload, ObjectMetadata payload, and the WallPhysics payload. Thus, the encoder side 11 may perform at least some of the operations described herein to encode the payload, and the decoder side 12 may perform at least some of the operations described herein with respect to the Position( ) syntax, to extract the positional data of the sound sources and/or origins within the encoded scene tree structure. By having one payload that describes the positions of each of these elements, reduces complexity and provides efficiently coded positions of the 3D scene.

In addition, the following Position( ) payload may be defined by the encoder side 11 based on one or more criteria. For instance, the payload may be defined (and/or adjusted) based on the current (or required) bitrate for the encoder side to transmit the bitstream 20 over a data connection between the encoder side device and a decoder-side device. As an example, the size of the payload may be adjusted (e.g., lowered) in cases in which the bitrate is low (e.g., below a threshold). In particular, the encoder may encode an initial configuration payload and/or future payloads with less bits in order to reduce their size for low bitrate conditions. This may be the case when the decoder side device is communicatively coupled to the encoder side device over a slow data connection (e.g., due to the slow network 43). As described herein, the encoder side device may adjust (the initial and/or future) payloads by adjusting the size (e.g., number of bits) of the payloads that may be used to define the positional data of sources and/or origins of the 3D scene. As another example, the payload may be adjusted based on positional changes of sound sources and/or 3D sub-scenes within the 3D scene. All of which may allow the system 10 to transmit the payload in the bitstream 20 under limited (or reduced) bitrate conditions. More about the criteria and adjusting the payload is described herein.

A description of the syntax with respect to the encoder side 11 and decoder side 12 is as follows. In particular, the following description of the position payload will be with respect to a sound source position (e.g., position 39a as shown in FIG. 2) within a 3D scene, such as the sound source of the engine 46a in FIG. 1. In addition, however, the position payload may describe the position of an origin of the scene tree structure, as described herein. First, the decoder side 12 determines whether the Position( ) payload is being received at initial configuration by determining whether a flag, forConfig is a first value, e.g., if (forConfig==1). This may be the case when the payload is the first payload received for initializing the bitstream (or once the bitstream has been established). If so, the decoder side 12 may determine that the payload includes one or more one-bit identifiers (e.g., having a certain value) that indicate whether certain parameters associated with the origin of the Position( ) payload may be adjusted. For instance, the payload may include a refOriginIdAdaptation identifier that indicates whether a reference origin for the origin (e.g., position 39a of the sound source 46a) associated with the payload may be adapted or changed, and may include a distanceMaxAdaptation identifier that indicates whether a distance parameter (e.g., the maximum distance parameter) associated with the payload may be adapted or changed from previous payloads. Such adaptations may allow for the encoder side to adjust the positional data associated with the payload and/or may adjust the size (e.g., reduce the number of bits) of the encoded payload. In one aspect, since the payload is being received during an initial configuration, both of these identifiers may be assigned a value (e.g., zero) that may indicate that no adaptation is required. This may be the case when the payload is the first payload to be received by the decoder. These identifiers, however, may be adjusted by the encoder side 11 during transmission of later payloads within the bitstream. More about these identifiers is described herein.

The payload also includes several bitstream identifiers that adjust the bit size of at least some of the positional data of the payload. As described herein, the payload may include several positional values (e.g., as integers) that represent the position and/or orientation of an origin/sound source (with respect to a reference origin) stored in the payload having a certain bit size. As described herein, each integer value represents a corresponding stepwise value (or position within a coordinate system with respect to a reference origin) within a value range (e.g., maximum distance parameter). The size (or spatial resolution) of each step may be based on the bit size of the positional values, where the more bits that may be used to represent the integers may reduce the size. More about spatial resolution is described herein.

Increasing the bit size, however, may also increases the size (bit count) of the payload. As a result, the encoder side 11 may be configured to add a number of bits associated with the positional data. In one aspect, the number of bits of one or more of these identifiers may be set to a predefined value by the encoder for the initial configuration. In another aspect, the encoder side 11 may determine the amount of bits to be added based on a network analysis of the data connection between the encoder and decoder sides. For example, in low bitrate conditions, the encoder side 11 may set these values to a low value (e.g., below a threshold) in order not to over saturate the connection.

The decoder side 12 may determine a number of added bits to the positional data based on one or more four-bit integers that may be received through the bitstream. Specifically, the identifiers may include, bsCoordAddedBits and bsRotAddedBits. In particular, bsCoordAddedBits is an encoded bitstream value of bits that are to be added to coordinate values of the positional data that may be used to identify (decode) the position of an (encoded) origin within one or more coordinate systems with respect to a reference origin. Identifier bsRotAddedBits includes an encoded bitstream value of bits that are to be added to rotational values (data) of the positional data that may be used to indicate an origin's orientation with respect to a reference origin. To identify the number of added bits, the decoder side may multiply each of the identifiers by two. In which case, the number of bits added to coordinate values may be coordAddedBits and the number of bits added to the rotational data may be rotAddedBits. More about the added bits is described herein.

The position payload includes an identifier, referenceSceneOriginId, of a scene origin of the position of the Position( ) payload (e.g., sound source position 39a references). In particular, the referenceSceneOriginId may be an identifier (e.g., as a six-bit integer) of an origin within the scene tree structure. Continuing with the previous example, this identifier, which may be unique to each origin within the scene tree structure, as described herein, may be an identifier for the sub-scene origin 38a of the scene tree structure 36. Thus, as described herein, the position defined by the position payload may be with respect to this reference origin. In one aspect, when the referenceSceneOriginId is zero, it references the global scene origin (e.g., origin 37), which may be an origin of a coordinate system (e.g., being x=0, y=0, and z=0, in a Cartesian coordinate system).

During the initial configuration (e.g., as forConfig==1), the decoder side 12 may determine whether a flag has been defined within the payload to have a first value (e.g., as a one-bit integer) in the bitstream (e.g., if(referenceSceneOriginIdIsZero==1)) that may indicated whether the scene origin of the position of the Position( ) payload (e.g., sound source position 39a) references the global scene origin. If not, the payload may include the referenceSceneOriginId. If, however, referenceSceneOriginIdIsZero is equal to one, then the decoder side 12 may determine that referenceSceneOriginId=0, which indicates that the reference origin is the global scene origin. In this case, the encoder side 11 may encode the payload with five less bits when the origin referenced by the Position( ) payload is the global scene origin, since in that case the payload would not include a referenceSceneOriginId to another reference origin of the encoded tree structure. Again, this may reduce the size of the payload, thereby allowing the payload to be transmitted during low-bitrate conditions.

In addition, during the initial configuration, the decoder side 12 may retrieve an encoded maximum distance parameter, bsDistanceMax (e.g., based on if((forConfig==1|| (adaptDistanceMax==1))), which is a four-bit encoded integer that may be used by the decoder to determine the maximum distance at which an origin (or sound source) may be positioned with respect to its reference origin. In one aspect, the decoder side 12 may determine a (decoded) maximum distance parameter (or value), as "maxDistance", which describes a maximum distance at which a position within a 3D scene has been encoded by the encoder side 11. In one aspect, the maxDistance defines a distance at which an encoded position of an element of the 3D scene (e.g., an origin of a sub-scene or a position of a sound source) cannot exceed from the position payload's (e.g., reference) origin. In another aspect, the value may be a scaling factor according to which at least some position data of the Position( ) payload was normalized by the encoder side. As a result, positional data within the position payload may be integers that represent normalized values between 0 and 1 or between −1 and 1. In one aspect, the decoder determines maxDistance based on the encoded bitstream maximum distance parameter, bsDistanceMax. For instance, maxDistance may be determined based on $$\text{maxDistance} = 2^{\text{bsDistanceMax}}[\text{meters}]$$

In one aspect, maxDistance may be a distance in meters, and may be user defined (and/or encoder defined) based on the audio program. For example, when bsDistanceMax is equal to eight, the maxDistance may be 256 meters. In another aspect, maxDistance may be a maximum distance according to another unit of length, such as centimeters. As an example, when bsDistanceMax is eight, encoded positional data of the Position( ) payload may not extend from its reference origin by 256 meters (e.g., having a range of between −256 meters and 256 meters from a reference origin). In one aspect, the maximum distance parameter may describe or effect a spatial resolution for positions (e.g., of sound sources and origins) within a 3D scene (e.g., within a 3D sub-scene and/or a 3D global scene). In one aspect, the resolution of the 3D scene may be proportional (e.g., inversely proportional) to the maximum distance value. For example, for large scenes (e.g., a boat that is at sea) may have a large maximum distance, in which case the 3D scene may have a low resolution (based on the bit size of the positional data), whereas small scenes (e.g., within a cabin in the boat) may have a small maximum distance, and in which case the 3D scene may have a high resolution. More about how the spatial resolution is effected by the maximum distance is described herein. In one aspect, different Position( ) payloads may have different encoded maximum distance parameters for a given media program. In another aspect, each position of a sound source (and/or scene origin) that references a particular origin of a sub-scene may have a same maximum distance. More about Table 3 is described herein.

FIG. 10b includes Table 4 of a continuation of syntax of the Position( ) payload. The decoder determines whether a flag has been defined within the Position( ) payload to have a first value (e.g., as a one-bit integer) in the bitstream (e.g., if(translationPresent==1)) that indicates whether the position associated with the payload is translated with respect to the referenced scene origin. In particular, the encoder may have indicated that the flag be the first value if the sound source position was positioned somewhere within a coordinate system other than at the system's origin.

The decoder side 12 may determine whether the encoder side 11 has encoded at least a portion of the positional data using differential (or delta) encoding based on whether the payload is associated with the initial configuration. For the initial configuration (e.g., forConfig==1), the decoder may determine that delta encoding was not used, since coordDeltaCoding=0. In one aspect, delta encoding relates to transmitting the data as differences or deltas between sequential data. In particular, an encoder determines a difference between a previously transmitted piece of data with a current piece of data that is to be transmitted, and then encodes and transmits the difference. As a result, when transmitting delta encoded data, the positional data within the payload may require less bits, since it is being stored as changes to a previously transmitted positional data. Since, however, the initial configuration does not include previously transmitted data, the encoder would not have encoded the first payload using delta coding. If, however, the payload is a subsequent payload (e.g., based on changes to an origin's position), the payload may include a one-bit flag, coordDeltaCoding, indicating (e.g., based on a value) that the data stored in the payload was encoded using delta encoding. More about delta encoding is described herein.

If the data is not encoded using delta coding, e.g., if(coordDeltaCoding==0), the decoder side 12 may determine what coordinate system the positional data of the Position( ) payload is defined as (e.g., by the encoder). In one aspect, the coordinate system may be a Cartesian coordinate system or in a spherical coordinate system. In one aspect, the encoder side may select either coordinate system (e.g., based on system parameters or requirements). Based on what value coordinateSystem, a one-bit integer, is defined. For a first value, e.g., coordinateSystem=1, the coordinate system of the position within the payload may be a spherical coordinate system, whereas for a second value, e.g., coordinateSystem=0, the coordinate system of the position may be a Cartesian coordinate system.

In the case in which the coordinate system is Cartesian, the Position( ) payload stores coordinate values of positional data (e.g., the position of the sound source) as a set of Cartesian coordinates that indicate the position of an origin (or sound source) within the coordinate system with respect to an origin of a 3D scene that is referenced by referenceSceneOriginId. In particular, the encoded coordinate values, bsX, bsY, and bsZ, may be integers that represent normalized values (e.g., normalized with respect to the maxDistance), where each of these Cartesian coordinates may be normalized integers based on the assigned coordinate added bits. In one aspect, the decoder side 12 may determine, for each of the encoded coordinates, a total number of bits of each integer that may include six bits plus any additional bits assigned by coordAddedBits. As a result, the spatial resolution of each of these values may fluctuate based on the added bits and/or to changes to the maxDistance, for example. More about the resolution is described herein. In another aspect, each of the coordinate values may be integers of a defined amount of bits, such as being ten-bit integers.

To decode the encoded Cartesian coordinates within the bitstream into Cartesian coordinates (e.g., for a position of an origin or a position of a sound source within the coordinate system with respect to an origin of the 3D scene) that may be used by the audio renderer (e.g., as x, y, and z coordinates) for use in spatially rendering the audio program, the decoder scales the encoded coordinates using maxDistance. In one aspect, the decoder may normalize the integer values by applying a value normalization function, $V_{norm}( )$, to each of the values and multiples a resulting scalar value by the maxDistance, such as:

$x=\text{maxDistance}*V_{norm}(bsX,6+\text{coordAddedBits})$ $y=\text{maxDistance}*V_{norm}(bsY,6+\text{coordAddedBits})$ $z=\text{maxDistance}*V_{norm}(bsZ,6+\text{coordAddedBits})$ In one aspect, $V_{norm}$ may be defined by:

$$V_{norm}(V_{BS}, N_{bits}) \begin{cases} -1 & ; \text{if } V_{BS} == 0 \\ \dfrac{V_{BS}+1}{1<<(N_{bits}-1)} - 1; & \text{else} \end{cases}$$

where $V_{BS}$ is the encoded Cartesian coordinate (integer value) and $N_{bits}$ is the number of bits that make up the encoded coordinate values, where $V_{norm}$ has a range of [−1, 1]. In one aspect, a left shift operation is indicated by "<<", where y=x<<b means that the value of x is shifted by b bits to the left. In another aspect, this value may be computed using y=x(2^B).

As a result, the encoder side 11 may encode positions of origins (sound sources) in a stepwise fashion, where the size of the step may be the spatial resolution of the positions that may be based on the maxDistance and/or the number of total bits of the encoded positional data. In one aspect, the resolution may be limited to the quantization of the bitstream values of the positional data encoded within the Position( ) payload (e.g., bsX, bsY, and bsZ). As an example, when the maxDistance is 256 meters (e.g., bsDistanceMax is eight) and the total bits of bsX is eight (e.g., coordAddedBits is two), each value of (e.g., the possible 256 values of) bsX may correspond to at least a two-meter step size within a range of −256 meters to 256 meters. For example, when bsX is 128, x is two meters (in the positive direction) from its reference origin, and when bsX is 129, x is four meters from its reference origin. Here, the spatial resolution of the decoded x-position of the decoded origin is two meters. The resolution, however, may change based on changes to the maxDistance and/or the total bits. Continuing with the previous example, if maxDistance were to increase to 512 (bsDistanceMax is nine) while the total bits of bsX remains eight, the spatial resolution of x is now four meters. The spatial resolution of the encoded positional data is decreased by reducing the granularity at which positions may be spatially rendered. Thus, the decoder side 12 may determine a decoded position of an origin (sound source) at a spatial resolution based on the maximum distance parameter and the encoded positional data.

In one aspect, the encoder side 11 may encode positional data according to the spatial resolution. In particular, the encoder side 11 may snap (e.g., round up or down) positions of origins (sound sources) to a nearest step size according to the bit size that the positions are to be encoded and the maxDistance. Continuing with the previous example, the encoder side 11 may identify a position of a sound source (e.g., position 39a) to be 1.5 meters from a reference origin (e.g., origin 38a) in the x-direction. In which case, the encoder side 11 may encode the position to two meters since the positional data may have a spatial resolution of at least two meters. In another aspect, the identified positions 19 (e.g., by identifier 14) may already correspond to the step size at which the encoder 15 is to encode the positions.

As described herein, the maxDistance may be adjusted (e.g., in future position payloads), which may increase the maximum distance of the positional data, but may also degrade (e.g., reduce) the spatial resolution (e.g., increasing the step size) of the positional data. As a result, the spatial resolution of the sound source may be dependent upon the number of bits that were added to the encoded values in the bitstream by the encoder and the maxDistance. This is in contrast to conventional resolution schemes, where positions are encoded for a maximum possible distance for a particular scene, while the resolution cannot be changed. In the present disclosure, however, the maxDistance may be adjusted by the encoder side 11, thus providing the audio codec system the ability to adjust the resulting spatial resolution. In another aspect, the bit quantization may be different and/or the maxDistance may be defined differently.

Returning to the syntax, in the case in which the coordinate system is a spherical coordinate system, the Position( ) payload stores positional data of the payload as a set of spherical coordinates that indicate the position (e.g., of the origin or sound source) within the coordinate system with respect to an origin, where the origin is at the origin of the 3D scene referenced by referenceSceneOriginId. In particular, the spherical coordinates may be encoded values that represent normalized spherical coordinates, such as an encoded azimuth value, bsAzimuth, an encoded elevation value, bsElevation, and an encoded radius, bsRadius. In one aspect, each of the encoded values may be normalized values (integers). The size of each of these values may be based on whether any coordinate bits were added. In which case, each of these values may be stored in the bitstream as integers with different (or similar) bits, based on whether bits were added to the positional data. For instance, bsAzimuth is an integer with a bit size of seven bits plus coordAddedBits, bsElevation is an integer with a bit size of six bits plus coordAddedBits, and bsRadius is an integer with a bit size of five bits plus coordAddedBits. In one aspect, the bsRadius may be normalized with respect to maxDistance. In another aspect, the encoded values may be integers of defined bit counts, such as bsAzimuth being an eleven-bit integer, bsElevation being a ten-bit integer, and bsRadius being an eight-bit integer.

In one aspect, to decode the encoded spherical coordinates into values (e.g., azimuth, elevation, radius) that can be used by the audio renderer for spatially rendering the sound source, the decoder may apply the value normalization function to each of the encoded values. For example, the decoder may determine decoded azimuth and elevation using $V_{norm}$. Specifically, the decoder may determine these values as:

Azimuth=180°*$V_{norm}$(bsAzimuth,7+coordAddedBits)

Elevation=900*$V_{norm}$(bsElevation,6+coordAddedBits)

In one aspect, to determine the Radius, however, the decoder may use a magnitude normalization function, $M_{norm}$, as follows:

$$M_{norm}(V_{BS}, N_{bits}) \begin{cases} 0 & ; \text{if } V_{BS} == 0 \\ \frac{V_{BS}+1}{1 << (N_{bits}-1)} - 1; & \text{else} \end{cases}$$

where $M_{norm}$ has a range of [0, 1]. In particular, the Radius may be determined based on Radius=maxDistance*$M_{norm}$(bsRadius,5+coordAddedBits)

Similar to the values of the Cartesian coordinate system, the resolution of these spherical values may be based on the bit count of the encoded integers and/or the maxDistance. In one aspect, the Position( ) payload includes the position as spherical coordinates with the encoded radius. In which case, the decoder side is configured to determine the decoded radius for use by the audio renderer by decoding the encoded radius by determining a normalized radius based on the encoded radius and $M_{norm}$ and by scaling the result according to the maxDistance.

Turning to Table 5 of FIG. 10c, returning to the Position( ) payload syntax, the decoder side 12 may determine whether the bitstream includes a flag that is at a first value (as a one-bit value within the bitstream) that indicates whether the positional data includes (e.g., rotational data as) rotational parameters that indicate the sound source (or origin) associated with the Position( ) payload is rotating (or is to rotate) with respect to (or has a different orientation than) its reference origin. In one aspect, the Position( ) payload associated with the global scene origin (e.g., referenceSceneOriginId=0), may not include rotational parameters (e.g., since it does not reference another origin in the 3D scene). If, however, the flag is the first value (e.g., quaternionsPresent==1), the bitstream indicates that the payload includes rotational data. The decoder side 12 may determine whether delta coding has been used to encode the rotational data. Again, in the case of the initial configuration, if(forConfig==1), the bitstream may not include a one-bit flag or the flag may be of a first value, e.g., rotDeltaCoding=0, and therefore the bitstream includes four rotation quaternions, bsQ0, bsQ1, bsQ2, and bsQ3, each of which is an integer that represents a corresponding normalized value, with a total of eight bits plus rotAddedBits of additional bits that were added for the rotational data. In another aspect, the four normalized rotation quaternions may have a defined bit count, such as being eleven-bit integers.

The decoder side 12 may be configured to decode (extract) the encoded rotational parameters (encoded quaternions) from the bitstream that indicate the orientation of the sound source. In one aspect, the encoded quaternions may be integers of at least eight bits, based on whether bits were added according to rotAddedBits. The decoder side 12 may produce the following quaternions, q0, q1, q2, and q3, which may be used by the audio renderer to adjust the orientation of a position within the 3D scene using at least some of the extracted encoded quaternions. In particular, the decoder side 12 may produce decoded quaternions, as follows:

$q0=V_{norm}(bsQ0,8+\text{rotAddedBits})$ $q1=V_{norm}(bsQ1,8+\text{rotAddedBits})$ $q2=V_{norm}(bsQ2,8+\text{rotAddedBits})$ $q3=V_{norm}(bsQ3,8+\text{rotAddedBits})$ In one aspect, the decoder side 12 may spatially render a sound source according to the four encoded (decoded) quaternions. In particular, audio rendering of the decoder side may use the decoded quaternions to rotate the sound source during spatial rendering. In particular, the audio renderer may spatially render a rotating sound source based on the orientation of the sound source, indicated by the rotational parameters, with respect to the listener (e.g., an orientation of the listener, which may be determined based on head tracking data, as described herein), such that the listener may perceive the sound source from a different angel (e.g., within acoustic space). Thus, as described herein, scene origins are encoded using the SceneOrigin( ) payload, where the Position( ) payload syntax includes 1) the position (and/or rotation) of the origin, as positional data, and 2) a reference to its origin an identifier, referenceSceneOriginId).

As described thus far, the bitstream may include the scene tree structure (e.g., as the ScenePositions( ) payload) that indicates an initial configuration of the 3D scene origins. In another aspect, along with the initial configuration of the origins, the bitstream may include sound source positions (e.g., ObjectMetadata( ) payload and/or WallPhysics( ) payload). In one aspect, the positions of the sound sources within the object and wall payloads received along with the ScenePositions( ) payload may be an initial position for the sound sources (e.g., at a beginning portion along a playback duration of an audio program). As a result, the decoder side may be configured to define the initial configuration of the sound sources with respect to a listener position for spatial rendering, which may be at a beginning portion of the rendered media program. In one aspect, positions of origins and/or sound sources may change during playback of the media program. For instance, positions may change based on the media program (with respect to time) and/or positions may change with respect to the listener position based on movement of the listener within a 3D scene (e.g., within a 3D sub-scene or the 3D global scene).

Figure 11:
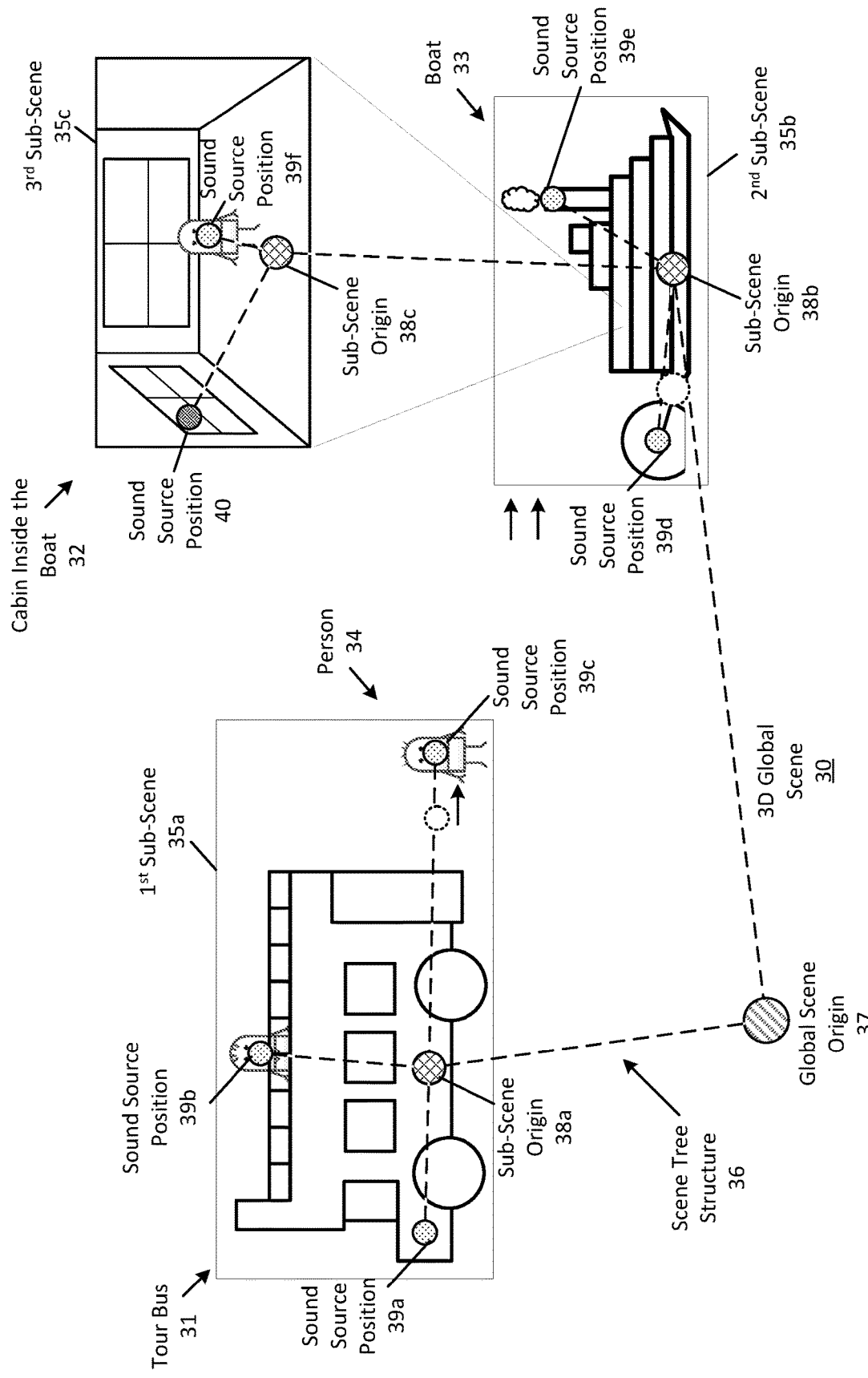
FIG. 11 shows the 3D scene with the scene tree structure from FIG. 2 in which elements of the 3D scene have moved according to one aspect.

FIG. 11 shows an example of changing positions within one or more 3D scenes. For example, this figure shows the 3D global scene 30 with the scene tree structure 36 from FIG. 3 in which elements of the 3D scene have moved (and/or changed their orientation) according to one aspect. In particular, this figure is showing how a 3D sub-scene (origin) and/or a sound source (position) moves as their associated visual structures or locations move within the video content. In another aspect, origins and/or positions of sound sources may move in audio programs, as described herein. In particular, as shown the sound source position 39*c* of the person 34 talking has moved away from its original position (e.g., shown as a white circle with a dashed border) to a new position (e.g., away from the bus) within the first sub-scene 35*a* and with respect to the sub-scene origin 38*a*. In addition to moving sound sources within one or more 3D scenes, 3D sub-scenes may move as well. For instance, the second sub-scene 35*b* has moved away from the tour bus 31, which has resulted in the sub-scene origin 38*b* moving from its original position to a new position with respect to the 3D global scene 30. As described herein, the encoder side may provide position (or scene metadata) updates for elements within a 3D scene that is being encoded and streamed, via a bitstream, to a decoder device. The decoder side may then use the updates to adjust spatial rendering, as described herein. In one aspect, these updates may include less data than the scene tree structure that was encoded for the initial configuration of the 3D scene, thereby enhancing efficiency of data transmission by the encoder side (e.g., in order to accommodate low-bitrate situations).

Figure 12:
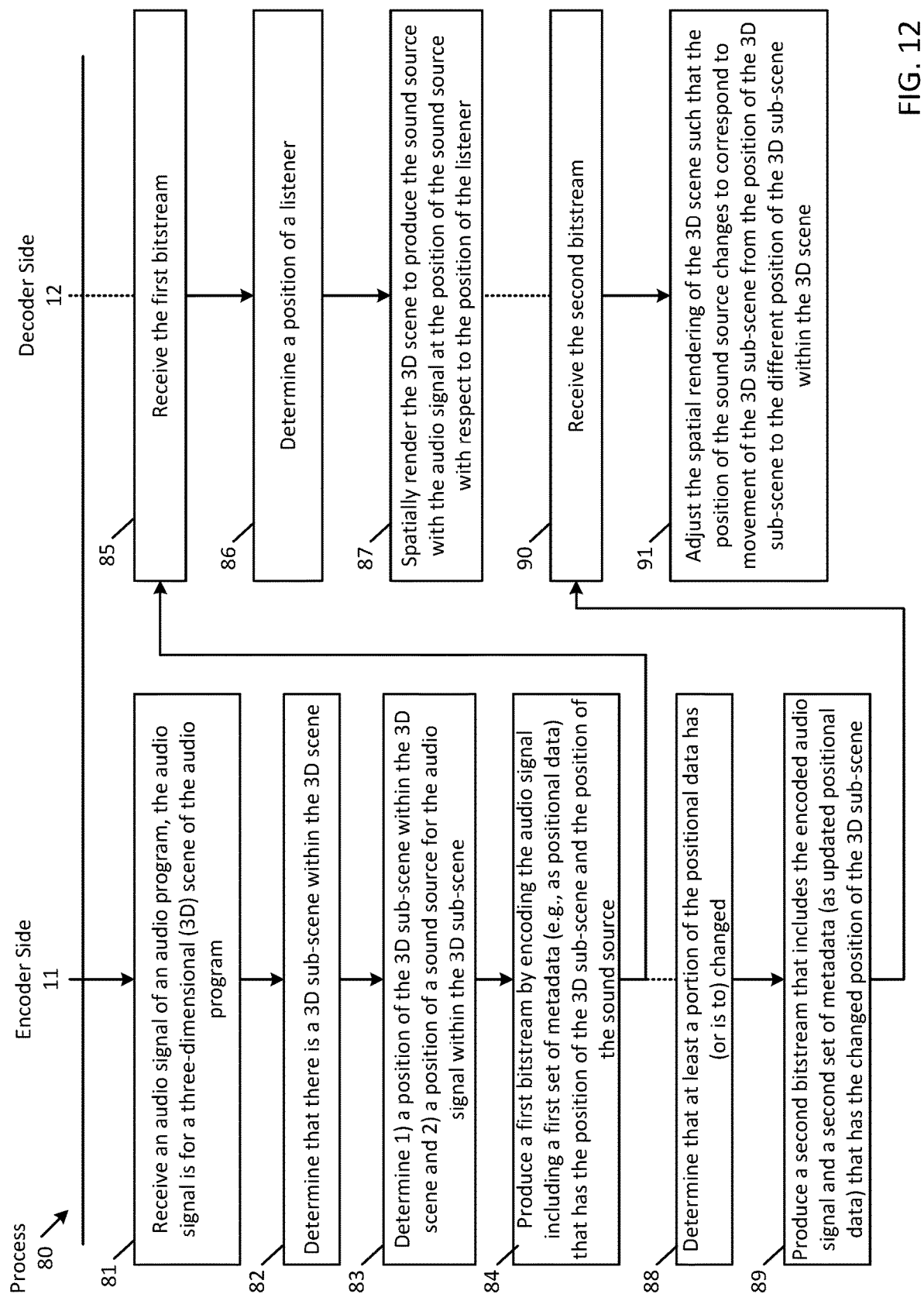
FIG. 12 is a system flowchart of an aspect of a process in which the encoder side transmits scene metadata updates, which are used by the decoder side to adjust spatial rendering.

FIG. 12 is a system flowchart of an aspect of a process 80 in which the encoder side 11 transmits scene metadata updates, which are used by the decoder side 12 to adjust spatial rendering of a media program. The process 80 begins by the encoder side 11 receiving an audio signal of an audio program (e.g., which may be a part of an A/V program), the audio signal is for a 3D scene of the audio program (at block 81). For instance, the audio signal may be associated with a sound source within the 3D scene. The encoder side 11 determines that there is a 3D sub-scene within the 3D scene (at block 82). The encoder side 11 determines 1) a position of (e.g., an origin of) the 3D sub-scene within the 3D (e.g., global) scene and 2) a position of a sound source for the audio signal within the 3D sub-scene (at block 83). The encoder side produces a first bitstream by encoding the audio signal including a first set of metadata (e.g., as positional data) that has the position of the 3D sub-scene and the position of the sound source (at block 84). In particular, the encoder side may encode the position of the sub-scene as the ScenePositions( ) payload, which may include a Position( ) payload and the position of the sound source as a Position( ) payload, and add these payloads into the bitstream.

The decoder side 12 receives the first bitstream and decodes the audio signal and the first set of metadata stored therein (at block 85). The decoder side 12 determines a position of the listener (at block 86), and then spatially renders the 3D scene to produce the sound source with the audio signal at the position of the sound source with respect to the position of the listener.

At some period of time after the first bitstream is transmitted by the encoder side 11 to the decoder side 12, the encoder side 11 may determine that at least a portion of the positional data has (or is to be) changed (at block 88). In particular, the encoder side may determine whether at least some of the positional data (e.g., coordinates and/or rotational data) is to be updated.

In one aspect, the encoder may determine that the data is to be updated based on changes or updates within the 3D scene. For example, positional data of an origin of a 3D scene (e.g., a first origin of a first 3D sub-scene) may need to be updated when it moves to a different position (and/or have a different orientation) within another 3D scene (e.g., which may be the 3D global scene or another 3D sub-scene in which the moving first 3D sub-scene is within), with respect to another origin (e.g., a 3D global scene origin of the 3D scene). For instance, the identifier 14 may perform at least some of the operations described herein to determine that the sub-scene is moving within the 3D global scene, such as the boat 33 moving with respect to the global scene origin 37, as shown in FIG. 11. In another aspect, the encoder side 11 may send an updated Position( ) payload for at least some of the origins (e.g., of sound sources and/or 3D sub-scenes) of the 3D scene for each (or one or more) audio frames of the audio content over a period of time. More about how the encoder side 11 determines to update the payload is described herein.

In which case, the encoder side 11 may produce a second bitstream that includes the encoded audio signal and a second set of metadata (as updated positional data) that has the changed position of the 3D sub-scene (at block 89). In particular, the encoder side may encode a new position of the first origin relative to a second origin into new metadata of the second bitstream. In one aspect, the new position may reference one or more origins (e.g., to which the sub-scene relates) using the one or more origin's identifiers, as described herein. In another aspect, the encoded audio signal may be a portion of the audio signal that is subsequent along a playback duration than the audio signal that was transmitted to the decoder side with the first set of metadata. In one aspect, the second set of metadata may include scene metadata updates may include less data than the first set of metadata. In particular, the second set of metadata may only include positions of sound sources and/or origins of sub-scenes which need to be updated. Other positions (e.g., which are or have been static) may be omitted from the second set of metadata. More about the scene metadata updates is described herein.

The decoder side 12 receives the second bitstream and decodes the audio signal and the second set of metadata (at block 90). In one aspect, the second set of metadata may include a position update payload, as described herein, that includes a new position (and/or orientation as indicated by rotational parameters, as described herein) of a first origin relative to a second origin. The decoder side adjusts the spatial rendering of the 3D scene such that the position of the sound source changes to correspond to movement of the 3D sub-scene from the position of the 3D sub-scene to the different position of the 3D sub-scene within the 3D scene (at block 91). For instance, the decoder determines that the position of a sound source has moved with respect to a movement of the origin from its original position to its new position, as indicated by the second set of metadata. For example, referring to FIG. 11, the decoder side determines that the sound source position 39*e* has moved with respect to the movement of the sub-scene origin 38*b*. In one aspect, from this movement, the audio renderer 23 of the decoder side 12 may determine a new translation and/or a new rotation of the sound source position with respect to the listener's position. From this, the decoder side adjusts the spatial rendering of the audio signal based on the movement of the position of the sound source.

In one aspect, at least one sound source may remain in its position (e.g., its original position as indicated by the sound source's position payload during initial configuration of the media program) with respect to the listener, even when one or more other sound source positions (and/or origins) are updated. For example, a position of one sound source may remain in its position with respect to a listener as either 1) a position of a different sound source (and/or an origin of a 3D sub-scene) changes or 2) the position of the listener changes. Although the sound source may remain in its position, the decoder side may still adjust spatial rendering of the sound source, as described herein. For instance, as the listener's position changes (e.g., due to head tracking data received at the decoder side), the audio renderer 23 may adjust spatial rendering of a (e.g., static) sound source, such that the listener continues to perceive the sound source at a same position from before the listener moved.

Turning to FIG. 13, this figure shows a Table 6 that includes syntax of the ScenePositionsUpdate( ) payload, which as described herein, includes the scene metadata updates that describes updated (or changed) positions within the scene tree structure. Thus, in order to update origin positions, a subsequent bitstream may include the ScenePositionsUpdate payload, as opposed to having the entire scene tree structure, ScenePositions( ) payload in order to reduce the amount of encoded data that is subsequently transmitted to the decoder side, while maintaining precise positions of sub-scenes within the 3D scene. In one aspect, the encoder side 11 may encode these payloads and the decoder side 12 may decode (or extract) data from the payload (for spatial rendering) based on at least some of the operations as described in process 80 of FIG. 12.

A description of the syntax is as follows. The decoder side 12 may receive the ScenePositionsUpdate( ) payload from the encoder side and, for each of the number of scene origins encoded within the ScenePositions( ), which was previously received by the decoder, the decoder determines whether the payload indicates that a scene update is present (e.g., as a single bit flag), as if(updatePresent). In particular, the decoder may determine whether new metadata (e.g., received after the metadata of the initial configuration) includes a single bit that indicates whether a position (e.g., of an origin and/or sound source) is to be updated. The metadata may include a single bit having a first value that indicates an associated origin is not to be updated. If, however, the single bit is a second value, it may indicate that at least one origin is to be updated. If so, the payload may include an updated 3D scene origin for that particular updated scene, SceneOrigin(i+1, forConfig=0), where forConfig may be false thereby indicating that scene position is to be updated after the initial configuration. The updated SceneOrigin may include a new Position( ) payload that was updated (e.g., having updated positional data) by the encoder side. For instance, the new Position( ) payload may include at least one updated 1) bsDistanceMax, 2) bsX, bsY, bsZ or bsAzimuth, bsElevation, bsRadius, and 3) bsQ0, bsQ1, bsQ2, bsQ3. In another aspect, the new payload may include only of these parameters, such as only including bsX when the origin only moves in the X-direction, for example. In some aspects, the new payload may include a different maximum distance parameter, when the resolution of the 3D scene has changed (e.g., by a content creator). Thus, for example, the encoder side encodes a position update of a first origin relative to a second origin into new metadata (e.g., a new Position( ) payload associated with the ScenePositionsUpdate( ), where the update references the second origin using an identifier of the second origin.

In one aspect, the encoder side 11 may encode the updated Position( ) for limited bitrate conditions. Referring to FIGS. 10a-10c, the encoder side 11 may adjust the size of the Position( ) in order to accommodate low bitrate of a data connection, while at the same time maximizing the spatial resolution of the positional data. In particular, identifiers within the Position( ) payload may be adjusted by the encoder, whereby the decoder side 12 may determine and apply those changes to adapt the positional data of one or more origins (sound sources) for spatial rendering.

Referring to FIG. 10a, the decoder side 12 may determine whether a reference origin of an updated scene origin is to change to the global scene origin. The decoder may determine whether refOriginIdAdaptation has been set to a value by the encoder side 11 (e.g., a value of one), indicating that the reference origin is to be adjusted. The decoder side 12 may determine whether a one-bit identifier, adaptRefOriginId is equal to a first value (e.g., one) based on whether if((forConfig==0) && (refOriginIdAdaptation==1)). The decoder side may determine whether a one-bit flag, referenceSceneOriginIdIsZero, is equal to one. If that is the case, the decoder side may set the referenceSceneOriginId to zero, which may be the global scene origin. If, however, the referenceSceneOriginId is not zero, the referenceSceneOriginId of the payload may remain the same, or may indicate a different origin identifier. In one aspect, such identifiers may reduce the bit count of the payload by five bits. For instance, in the case in which the scene origin is to be the global scene origin, the updated payload may not include the six-bit referenceSceneOriginId.

In one aspect, the encoder side 11 may change the reference scene origin based on changes to the updated scene origin of the updated payload. For instance, when the scene origin has moved within a threshold distance of the global scene origin, the encoder side 11 may change the scene origin's reference origin (e.g., which may be an origin of a sub-scene) to the global scene origin since it is within a close proximity. In another aspect, the encoder side 11 may change the reference scene origin based on movement of a sound source within the 3D scene. For example, during playback a sound source (e.g., a barking dog) may move from one sub-scene to another, such as moving from one cabin in the boat to another cabin, where both cabins may be separate sub-scenes. In which case, the encoder side 11 may determine whether a sound source is within a threshold distance of another origin, and if so, may change the sound source's reference origin to the origin of the sub-scene in which it is located.

In one aspect, bsDistanceMax may remain constant for an entirety (e.g., during a playback session) of an audio program content that is streamed through the bitstream 20. For example, the encoder side 11 may determine (estimate) the maximum distance parameter and may set it such that it may cover future changes to positional data of origins and/or sound sources. This may be the case when the encoder side 11 has no prior knowledge of sound source movements, such as during a live broadcast of the audio program.

In another aspect, the encoder side 11 may adjust bsDistanceMax based on movement of the origin (or sound source). As described herein, bsDistanceMax relates to the maximum distance at which a position of an origin may be positioned with respect to its reference origin, where that position may be used for spatial rendering. As described herein, the spatial resolution of the origin's sound source may be dependent upon the relationship between bsDistanceMax, and the number of bits assigned to the source's positional data. As a result, as a sound source moves within the sound scene, it may move or need to move beyond the bsDistanceMax. For instance, when the maximum distance is 256 meters (e.g., bsDistanceMax being a value of eight), a sound source may be encoded up to 256 meters by the encoder side 11. As time goes on, however, the sound source may move beyond the 256 meters (e.g., the sound source being a car that is driving down the highway). As a result, the encoder side 11 may determine the movement of an origin of a sound source and then define bsDistanceMax to ensure that its location is within the range of the maximum distance (e.g., increasing the maximum distance to 512 by making bsDistanceMax a value of nine). As a result, when the decoder side 12 receives a new position of a sound source that includes an increased maximum distance parameter and new encoded positional data, the decoder side 12 may determine a new decoded position of a sound source at a lower spatial resolution based on the increased maximum distance parameter and the updated position payload with the new encoded positional data. This results in a higher spatial resolution (e.g., decreasing the step size of positions within the maximum distance) of the sound source when the source is closer, and works well as the source moves away and thereby reducing its spatial resolution.

Adjusting the bsDistanceMax based on movement may also provide for bitrate savings. For example, with 100 moving sound sources, and assuming that each source's location is to be updated in every audio frame (e.g., every 20 ms), this would require 5,000 Position( ) payloads to be sent by the encoder side 11 every second. Each bit in the payload may translate into a bitrate of 5 kbps. Adjusting bsDistanceMax reduces the size of future payloads when sound sources move over larger distances, since bsDistanceMax may be set to cover those distances. In particular, future updated payloads may not need to include bsDistanceMax, so long as their encoded positions stay within that maximum distance.

In one aspect, in addition to updating the maximum distance parameter, the encoder may update other positional data. For instance, when the position of an origin of a sound source exceeds a current maximum distance parameter, the encoder side 11 may update the maximum distance parameter and may encode new positional data that represents normalized positional data with respect to the updated maximum distance parameter. As described herein, since, however, the number of bits that describes the encoded positional data may remain the same, the spatial resolution of the position may change with respect to the updated maximum distance parameter.

Returning to the syntax, the decoder side 12 may determine whether the bsDistanceMax has been updated. In one aspect, the encoder side 11 may adjust the encoded maximum distance parameter based on how the updated scene origin's position changes with respect to its reference scene origin. For example, the encoder may adjust the maximum distance when the updated scene origin moves beyond a threshold distance (e.g., a boat moving 10 kilometers away), or may adjust this parameter when the origin moves within the threshold distance (e.g., bees swarming around or adjacent to the scene origin). In particular, the decoder determines whether a one-bit flag, adaptDistanceMax is set to one value (e.g., one) based on if((forConfig==0)&&(distanceMaxAdaptation==1). If this condition is satisfied, the decoder may determine a new four-bit distance parameter bsDistanceMax, which may be different than the parameter in a previous Position( ) payload.

As described thus far, parameters of the Position( ) payload may be updated based on changes to the sound scene and/or changes to the bitrate of the bitstream 20. In another aspect, the bitstream may support delta coding to reduce the required bitrate of the bitstream 20. Referring to Table 4 of FIG. 10*b*, the decoder may determine that the one-bit flag, coordDeltaCoding has been set to a first value (e.g., one) that indicates that encoded values of the positional data have been encoded using delta encoding. In one aspect, the decoder may determine this for payloads after the initial configuration. In one aspect, the encoder may set that flag to a second value (e.g., zero), in cases in which delta encoding is not necessary or does not provide sufficient spatial resolution. For example, in cases in which the bitrate of the bitstream may be high, the normalized values may be encoded without delta encoding. In another aspect, delta encoding may not be used when changes between a previous payload and the present payload is above a threshold.

Turning back to Table 5 of FIG. 10*c*, when coordDeltaCoding==1 and the coordinate system is Cartesian, the decoder may determine the encoded positional data to be encoded delta values, bsDeltaX, bsDeltaY, and bsDeltaZ, where each of these Cartesian coordinate are integers, with a bit count of two plus coordAddedBits. Each of the delta values may be the difference between a current (or new) encoded value (or value to be encoded) and a previously sent encoded value. For example, the encoder side 11 may determine that the position of origin is to change in the x-direction and determine a new bsX value, $bsX_{Current}$. In one aspect, this encoded value may be otherwise transmitted in an updated payload if delta coding were not used. A previous encoded value of bsX may be $bsX_{Previous}$. In which case, $bsDeltaX=bsX_{current}-bsX_{previous}$. In one aspect, the encoded delta values may be signed binary values, where the most significant bit indicates that the integer is positive when zero or negative when one. In one aspect, the delta values may be negative when the $bsX_{Current}$ value indicates that the coordinate value has moved closer to the reference origin from the previous payload.

To update the coordinates, the decoder may add the delta values to the previous coordinate values. The controller may determine the current encoded value by adding the delta value to the previous value. Continuing with the previous example, the decoder side 12 may determine $bsX_{Current}$ based on the combination (addition) of bsDeltaX and $bsX_{Previous}$. In one aspect, the decoder side may keep track of the previous encoded values while the bitstream is being streamed to the decoder side. The decoder may be configured to determine the coordinates by using the normalization functions described herein (e.g., for the x coordinate, replacing bsX with $bsX_{Current}$, where the number of bits would be based on the addition of bsDeltaX and $bsX_{Previous}$).

The decoder may perform similar operations when the coordinate system is a spherical coordinate system. In which case, the decoder may determine the encoded positional data as delta values of bsDeltaAzimuth that is an integer with a bit count of three plus coordAddedBits, bsDeltaElevation that is an integer with a bit count of two plus coordAddedBits, and bsDeltaRadius that is an integer with a bit count of one plus coordAddedBits. Similar to the Cartesian delta coordinates, each of these deltas may be the difference between a current spherical value and a previous value. Again, each of the normalized delta values may be signed binary values, where the most significant bit indicates a sign of the value and the remainder of the bits are the magnitude. In one aspect, when coordAddedBits is zero, bsDeltaRadius is zero, since it would only include one bit for its sign. Again, the decoder would add these delta values to the previous normalized values (through binary addition), and then determine the spherical coordinates using the normalization functions described herein.

When Quaternions are present, quaternionsPresent==1, and rotDeltaCoding==1, the decoder may also decode deltas of the rotational data. In this case, the payload includes deltas of the four rotation quaternions, as bsDeltaQ0, bsDeltaQ1, bsDeltaQ2, and bsDeltaQ3, where each of the normalized deltas is an integer with a bit count of four plus rotAddedBits. Each one of the deltas may be a difference between a current rotation quaternion (determined by the encoder) and a previous rotation quaternion. Each of the integers may be a signed binary integer, where the most significant bit is a sign value, and the remaining values indicate the magnitude of the integer. The decoder may add these delta values to the previous normalized values (used during a previous rotation of the scene origin of the Position( ) payload), and then may apply those values to the normalization function to determine the rotational parameters, q0, q1, q2, and q3.

As described herein, the encoder side may encode the ScenePositionsUpdate( ) payload that includes scene origin updates into the bitstream for transmission to the decoder side. In one aspect, when a position of a sound source is to be updated, the encoder side may be configured to produce a new Position( ) payload for that sound source and provide it to the decoder side for update. For example, responsive to determining that a position of a sound source is to move to a different position within a 3D scene, the encoder may adjust at least some positional data within the sound source's Position( ) payload (e.g., by adding the new position) with respect to an origin (e.g., the origin to which the sound source's previous payload referenced. From the new (updated) Position( ) received within the (e.g., updated) ObjectMetadata( ) payload, the decoder side adjusts the spatial rendering according to the sound source's new position.

Thus, the ScenePositions( ) payload provides the decoder with positions of static origins before rendering starts. If, however, a sub-scene moves over time during the presentation of the media program, its position must be updated dynamically by the encoder side. The syntax of the present disclosure supports updates for moving origins by using the ScenePositionsUpdate( ) payload, while positions of static origins are not required to be transmitted again (or at least until the static origin's position needs to be updated).

In one aspect, the encoder side may transmit the ScenePositionsUpdate( ) and/or new Position( ) payloads within updated ObjectMetadata( ) payloads along with subsequent portions of the media program that is being encoded and transmitted to the decoder side for spatial rendering. In some aspects, sound source payloads with static positions are not encoded in future subsequent portions of the bitstream. For instance, WallPhysics( ) payloads (e.g., which include the positional data and acoustic parameters, as described herein) for passive sound sources may only be transmitted once (e.g., with the initial configuration), since these sound sources do not move with respect to their origins.

Figure 14:
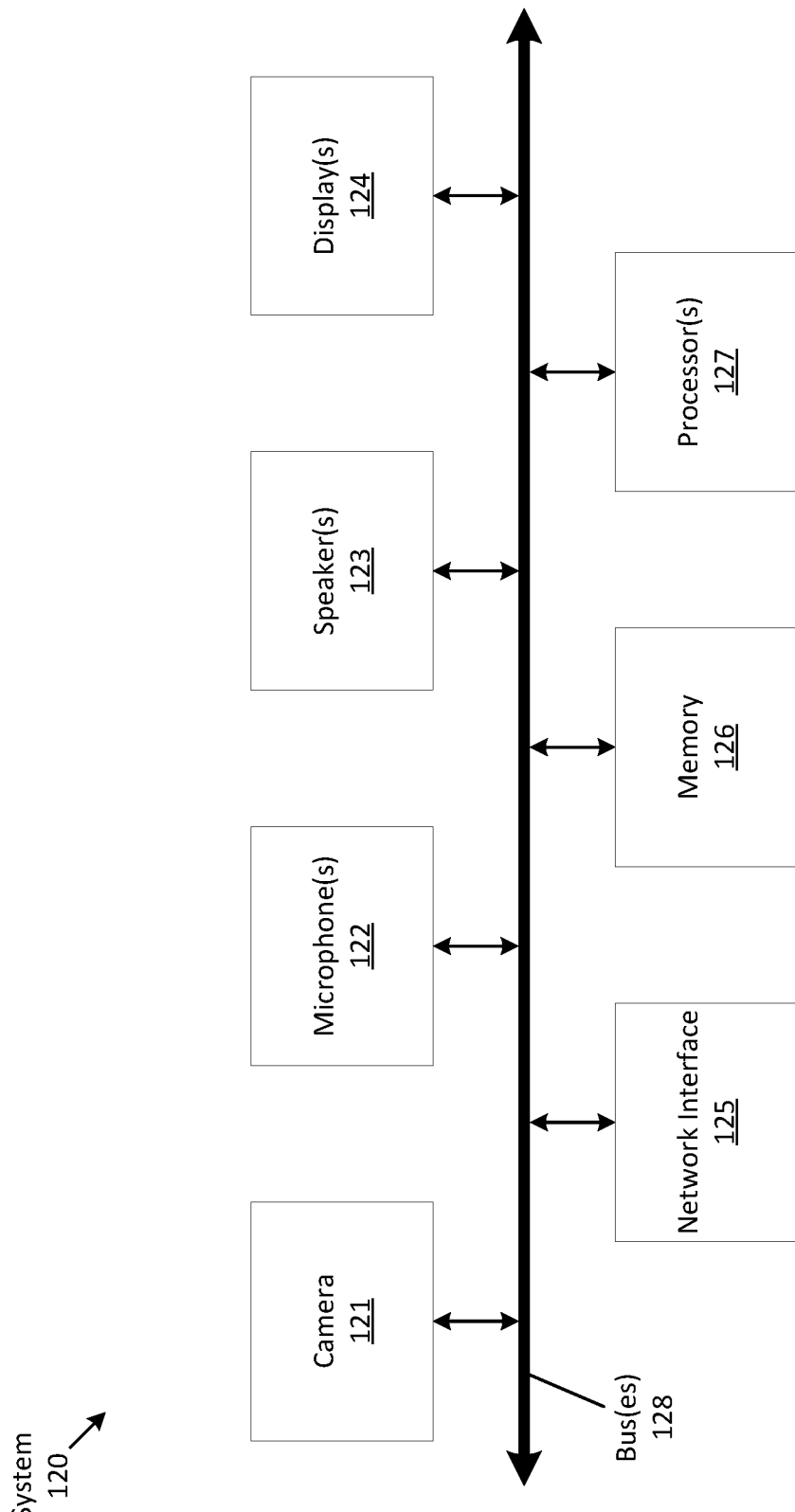
FIG. 14 illustrates an example of system hardware.

FIG. 14 shows a block diagram of audio processing system hardware, in one aspect, which may be used with any of the aspects described herein (e.g., media content device 42, playback device 44, and/or output device 45). This audio processing system can represent a general-purpose computer system or a special purpose computer system. Note that while FIG. 14 illustrates the various components of an audio processing system that may be incorporated into one or more of the devices described herein, it is merely one example of a particular implementation and is merely to illustrate the types of components that may be present in the system. FIG. 14 is not intended to represent any particular architecture or manner of interconnecting the components as such details are not germane to the aspects herein. It will also be appreciated that other types of audio processing systems that have fewer components than shown or more components than shown in FIG. 14 can also be used. Accordingly, the processes described herein are not limited to use with the hardware and software of FIG. 14.

As shown in FIG. 14, the audio processing system (or system) 120 (for example, a laptop computer, a desktop computer, a mobile phone, a smart phone, a tablet computer, a smart speaker, a head mounted display (HMD), a headphone (headset), or an infotainment system for an automobile or other vehicle) includes one or more buses 128 that serve to interconnect the various components of the system. One or more processors 127 are coupled to bus 128 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 126 can include Read Only Memory (ROM), volatile memory, and non-volatile memory, or combinations thereof, coupled to the bus using techniques known in the art. Camera 121, microphone(s) 122, speaker(s) 123, and display(s) 124 may be coupled to the bus.

Memory 126 can be connected to the bus and can include DRAM, a hard disk drive or a flash memory or a magnetic optical drive or magnetic memory or an optical drive or other types of memory systems that maintain data even after power is removed from the system. In one aspect, the processor 127 retrieves computer program instructions stored in a machine-readable storage medium (memory) and executes those instructions to perform operations described herein.

Audio hardware, although not shown, can be coupled to the one or more buses 128 in order to receive audio signals to be processed and output by speakers 123. Audio hardware can include digital to analog and/or analog to digital converters. Audio hardware can also include audio amplifiers and filters. The audio hardware can also interface with microphones 122 (e.g., microphone arrays) to receive audio signals (whether analog or digital), digitize them if necessary, and communicate the signals to the bus 128.

The network interface 125 may communicate with one or more remote devices and networks. For example, interface can communicate over known technologies such as Wi-Fi, 3G, 4G, 5G, Bluetooth, ZigBee, or other equivalent technologies. The interface can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 128 can be connected to each other through various bridges, controllers and/or adapters as is well known in the art. In one aspect, one or more network device(s) can be coupled to the bus 128. The network device(s) can be wired network devices (e.g., Ethernet) or wireless network devices (e.g., WI-FI, Bluetooth). In some aspects, various aspects described can be performed by a networked server in communication with one or more devices.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms "analyzer", "identifier", "renderer", "estimator", "controller", "component," "unit," "module," "logic", "generator", "optimizer", "processor", "mixer", "detector", "encoder" and "decoder" are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

According to one aspect, a method comprising: receiving a first bitstream that includes an encoded version of an audio signal for a three-dimensional (3D) scene and a first set of metadata that has 1) a position of a 3D sub-scene within the 3D scene and 2) a position of a sound source associated with the audio signal within the 3D sub-scene; determining a position of a listener within the 3D scene; spatially rendering the 3D scene to produce the sound source with the audio signal at the position of the sound source with respect to the position of the listener; receiving a second bitstream that includes a second set of metadata that has a different position of the 3D sub-scene within the 3D scene; and adjusting the spatial rendering of the 3D scene such that the position of the sound source changes to correspond to movement of the 3D sub-scene from the position of the 3D sub-scene to the different position of the 3D sub-scene within the 3D scene.

According to one aspect, a method performed by a programmed processor of a first electronic device, the method comprising: receiving an audio signal of an audio program, wherein the audio signal is for a three-dimensional (3D) scene of the audio program; determining that there is a 3D sub-scene within the 3D scene; determining 1) a position of the 3D sub-scene within the 3D scene and 2) a position of a sound source for the audio signal within the 3D sub-scene; producing a first bitstream by encoding the audio signal including a first set of metadata that has the position of the 3D sub-scene and the position of the sound source; transmitting the first bitstream to a second electronic device; determining that the position of the 3D sub-scene has changed; producing a second bitstream that includes the encoded audio signal and a second set of metadata that has the changed position of the 3D sub-scene; and transmitting the second bitstream to the second electronic device.

According to one aspect, a method comprising: receiving a bitstream that comprises: an encoded version of an audio signal that is associated with a sound source that is within a three-dimensional (3D) scene, a scene tree structure that includes an origin of the first 3D scene relative to an origin of a second 3D scene, and a position of the sound source within the first 3D scene relative to the origin of the first 3D scene, wherein the position references the origin of the first 3D scene using an identifier, wherein the scene tree structure defines an initial configuration of the sound source with respect to the first and second 3D scenes; determining a position of a listener with respect to the origin of the first 3D scene; producing a set of spatially rendered audio signals by spatially rendering the audio signal according to the position of the sound source with respect to the position of the listener; and using the one or more spatially rendered audio signals to drive one or more speakers to produce the sound source.

According to one aspect, a method comprising: receiving an audio program that includes an audio signal associated with a sound source that is within a first three-dimensional (3D) scene; encoding the audio signal into a bitstream; encoding into metadata of the bitstream 1) a scene tree structure that includes an origin of the first 3D scene relative to an origin of a second 3D scene of the audio program and 2) a position of the sound source relative to the origin of the first 3D scene, the position references the origin of the first 3D scene using an identifier, wherein the metadata defines an initial configuration of the sound source with respect to the first and second 3D scenes to be rendered by an audio playback device; and transmitting the bitstream to the audio playback device.

According to another aspect of the disclosure includes a decoder-side method of receiving a first bitstream that includes an encoded version of an audio signal for a three-dimensional (3D) scene and a first set of metadata that has 1) a position of a 3D sub-scene within the 3D scene and 2) a position of a sound source associated with the audio signal within the 3D sub-scene; determining a position of a listener within the 3D scene; spatially rendering the 3D scene to produce the sound source with the audio signal at the position of the sound source with respect to the position of the listener; receiving a second bitstream that includes a second set of metadata that has a different position of the 3D sub-scene within the 3D scene; and adjusting the spatial rendering of the 3D scene such that the position of the sound source changes to correspond to movement of the 3D sub-scene from the position of the 3D sub-scene to the different position of the 3D sub-scene within the 3D scene.

In one aspect, spatially rendering may include applying at least one spatial filter to the audio signal based on the position of the sound source with respect to the listener to produce one or more spatially rendered audio signals, where the sound source is produced by using the one or more spatially rendered audio signals to drive at least one speaker of an electronic device. In another aspect, the spatial filter is a head-related transfer function, and the electronic device is a headset, and the one or more spatially rendered audio signals are a set of binaural audio signals for driving a left speaker and a right speaker of the headset.

In another aspect, the method further includes: determining that the listener has moved; determining a translation and a rotation of the listener based on the listener's movement; determining a new position of the sound source based on an inverse translation of the translation and an inverse rotation of the rotation with respect to the position of the listener; and adjusting the spatial rendering of the 3D scene based on the new position of the sound source with respect to the position of the listener. In some aspects, the sound source is a first sound source and the audio signal is a first audio signal, where the first bitstream further comprises an encoded version of a second audio signal, where the first set of metadata further has a position of a second sound source associated with the second audio signal within the 3D scene such that the spatial rendering of the 3D scene also produces the second sound source with the second audio signal at the position of the second sound source with respect to the position of the listener. In some aspects, the second sound source remains in its position with respect to the position of the listener as either 1) the position of the first sound source changes or 2) the position of the listener changes. In another aspect, the second bitstream further includes encoded versions of the first and second audio signals. In one aspect, the 3D scene is of an audio program, where first bitstream is a beginning portion of the audio program and the second bitstream is a subsequent portion of the audio program, where future received bitstreams that include subsequent portions of the audio program do not include the position of the second sound source as metadata.

According to another aspect of the disclosure includes an encoder-side method that includes receiving an audio signal of an audio program, wherein the audio signal is for a three-dimensional (3D) scene of the audio program; determining that there is a 3D sub-scene within the 3D scene; determining 1) a position of the 3D sub-scene within the 3D scene and 2) a position of a sound source for the audio signal within the 3D sub-scene; producing a first bitstream by encoding the audio signal including a first set of metadata that has the position of the 3D sub-scene and the position of the sound source; transmitting the first bitstream to a second electronic device; determining that the position of the 3D sub-scene has changed; producing a second bitstream that includes the encoded audio signal and a second set of metadata that has the changed position of the 3D sub-scene; and transmitting the second bitstream to the second electronic device.

In one aspect, the sound source is a first sound source, where determining that there is a 3D sub-scene comprises determining that the position of the first sound source has a same trajectory within the 3D scene as a position of the second sound source within the 3D scene. In another aspect, determining the position of the 3D sub-scene includes assigning a location within the 3D scene as an origin of the 3D sub-scene. In some aspects, the position of the first sound source for the first audio signal is determined with respect to the origin of the 3D sub-scene. In another aspect, determining that the position of the 3D sub-scene has changed includes determining that the position of the origin within the 3D scene has moved with respect to an origin of the 3D scene.

In one aspect, determining that there is a 3D sub-scene includes determining that the sound source moves with a same trajectory as the 3D sub-scene. In another aspect, the sound source is a first sound source, wherein the method further includes determining 1) a position of a second sound source within the 3D scene and 2) a set of acoustic parameters associated with the second sound source, where the first set of metadata in the first bitstream further comprises the position of the second sound source and the set of acoustic parameters. In another aspect, the second bitstream is transmitted after the first bitstream, the second set of metadata transmitted with the second bitstream does not include the position of the second sound source and the set of acoustic parameters. In another aspect, the set of acoustic parameters includes at least one of a level of diffuseness, a cutoff frequency, a frequency response, a geometry of an object, an acoustic surface parameter of the object, a reflectivity value, an absorption value, and a material of the object.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the encoding, decoding, and spatially rendering operations, network operations, and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:
   receiving a first bitstream that includes an encoded version of an audio signal for a three-dimensional (3D) scene and a first set of metadata that has 1) a position of a 3D sub-scene within the 3D scene and 2) a position of a sound source associated with the audio signal within the 3D sub-scene;
   determining a position of a listener within the 3D scene;
   spatially rendering the 3D scene to produce the sound source with the audio signal at the position of the sound source with respect to the position of the listener;
   receiving a second bitstream that includes a second set of metadata that has a different position of the 3D sub-scene within the 3D scene; and
   adjusting the spatial rendering of the 3D scene such that the position of the sound source changes to correspond to movement of the 3D sub-scene from the position of the 3D sub-scene to the different position of the 3D sub-scene within the 3D scene.

2. The method of claim 1, wherein spatially rendering comprises applying at least one spatial filter to the audio signal based on the position of the sound source with respect to the listener to produce one or more spatially rendered audio signals, wherein the sound source is produced by using the one or more spatially rendered audio signals to drive at least one speaker of an electronic device.

3. The method of claim 2, wherein the spatial filter is a head-related transfer function, and the electronic device is a headset, and the one or more spatially rendered audio signals are a set of binaural audio signals for driving a left speaker and a right speaker of the headset.

4. The method of claim 1 further comprising:
   determining that the listener has moved;
   determining a translation and a rotation of the listener based on the listener's movement;
   determining a new position of the sound source based on an inverse translation of the translation and an inverse rotation of the rotation with respect to the position of the listener; and
   adjusting the spatial rendering of the 3D scene based on the new position of the sound source with respect to the position of the listener.

5. The method of claim 1, wherein the sound source is a first sound source and the audio signal is a first audio signal, wherein the first bitstream further comprises an encoded version of a second audio signal, wherein the first set of metadata further has a position of a second sound source associated with the second audio signal within the 3D scene such that the spatial rendering of the 3D scene also produces the second sound source with the second audio signal at the position of the second sound source with respect to the position of the listener.

6. The method of claim 5, wherein the second sound source remains in its position with respect to the position of the listener as either 1) the position of the first sound source changes or 2) the position of the listener changes.

7. The method of claim 5, wherein the second bitstream further includes encoded versions of the first and second audio signals.

8. The method of claim 7, wherein the 3D scene is of an audio program, wherein first bitstream is a beginning portion of the audio program and the second bitstream is a subsequent portion of the audio program, wherein future received bitstreams that include subsequent portions of the audio program do not include the position of the second sound source as metadata.

9. An electronic device comprising:
   at least one processor; and
   memory having stored therein instructions which when executed by the at least one processor causes the electronic device to:
   receive a first bitstream that includes an encoded version of an audio signal for a three-dimensional (3D) scene and metadata that has 1) a position of a 3D sub-scene within the 3D scene and 2) a position of a sound source associated with the audio signal within the 3D sub-scene;
   determine a listener position within the 3D scene;
   spatially render the 3D scene to produce the sound source with the audio signal at the position of the sound source with respect to the listener position;
   receive a second bitstream that includes new metadata that has a different position of the 3D sub-scene within the 3D scene; and
   adjust the spatial rendering of the 3D scene such that the position of the sound source changes to correspond to movement of the 3D sub-scene from the position of the 3D sub-scene to the different position of the 3D sub-scene within the 3D scene.

10. The electronic device of claim 9 further comprising a display, wherein the memory has further instructions to display, on the display, video content of which the 3D scene audibly represents.

11. The electronic device of claim 10, wherein the 3D sub-scene represents a structure or a location within the video content and the audio signal includes a sound associated with the structure or the location.

12. The electronic device of claim 11, wherein the position of the 3D sub-scene corresponds to a position of the structure or the location such that the 3D sub-scene moves as the structure or the location moves within the video content.

13. The electronic device of claim 11, wherein the video content is an extended reality (XR) environment, wherein the structure or the location and the position of the listener are within the XR environment.

14. The electronic device of claim 9, wherein spatially rendering the 3D scene comprises producing a set of binaural audio signals by applying a head-related transfer function to the audio signal based on the position of the sound source with respect to the listener position.

15. A non-transitory machine-readable medium having instructions stored therein which when executed by at least one processor of an electronic device causes the electronic device to:
    receive a first bitstream that includes an encoded version of an audio signal for a three-dimensional (3D) scene and metadata that has 1) a position of a 3D sub-scene within the 3D scene and 2) a position of a sound source associated with the audio signal within the 3D sub-scene;
    determine a listener position within the 3D scene;
    spatially render the 3D scene to produce the sound source with the audio signal at the position of the sound source with respect to the listener position;
    receive a second bitstream that includes new metadata that has a different position of the 3D sub-scene within the 3D scene; and
    adjust the spatial rendering of the 3D scene such that the position of the sound source changes to correspond to movement of the 3D sub-scene from the position of the 3D sub-scene to the different position of the 3D sub-scene within the 3D scene.

16. The non-transitory machine-readable medium of claim 15, wherein the sound source is a first sound source, wherein the metadata further has 1) a position of a second sound source within the 3D scene and 2) a set of acoustic parameters associated with the second sound source, wherein the spatial rendering of the 3D scene includes a sound of the audio signal originating at the position of the second sound source based on the set of acoustic parameters.

17. The non-transitory machine-readable medium of claim 16, wherein spatial rendering the 3D scene comprises:
    determining an audio filter based on the set of acoustic parameters;
    producing a filtered audio signal by applying the audio filter to the audio signal; and
    producing one or more spatially rendered audio signals by applying one or more spatial filters to the audio signal and the filtered audio signal.

18. The non-transitory machine-readable medium of claim 16 further comprising instructions to display, on a display, a visual environment of which the 3D scene audibly represents, wherein the second sound source is a reflective or diffractive sound source that produces the sound of the audio signal as being reflected or diffracted off an object within the visual environment.

19. The non-transitory machine-readable medium of claim 18, wherein the set of acoustic parameters comprises at least one of a level of diffuseness, a cutoff frequency, a frequency response, a geometry of the object, an acoustic surface parameter of the object, a reflectivity value, an absorption value, and a material of the object.

20. The non-transitory machine-readable medium of claim 15, wherein spatially rendering the 3D scene comprises producing a set of binaural audio signals by applying a head-related transfer function to the audio signal based on the position of the sound source with respect to the listener position.

* * * * *